(12) United States Patent
Ukai et al.

(10) Patent No.: US 7,901,645 B2
(45) Date of Patent: Mar. 8, 2011

(54) MERCURY REDUCTION SYSTEM AND MERCURY REDUCTION METHOD OF FLUE GAS CONTAINING MERCURY

(75) Inventors: Nobuyuki Ukai, Tokyo (JP); Moritoshi Murakami, Tokyo (JP); Susumu Okino, Tokyo (JP); Tatsuto Nagayasu, Tokyo (JP); Seiji Kagawa, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 12/640,629

(22) Filed: Dec. 17, 2009

(65) Prior Publication Data

US 2011/0002828 A1    Jan. 6, 2011

Related U.S. Application Data

(60) Provisional application No. 61/223,182, filed on Jul. 6, 2009.

(51) Int. Cl.
   - *B01D 53/50* (2006.01)
   - *B01D 53/56* (2006.01)
   - *B01D 53/64* (2006.01)
   - *B01D 53/74* (2006.01)

(52) U.S. Cl. .............. 423/210; 423/239.1; 423/243.01; 423/DIG. 5; 422/168; 422/169; 422/170; 422/171; 422/177; 422/180; 422/105; 422/111

(58) Field of Classification Search .............. 423/210, 423/239.1, 243.01, DIG. 5; 422/168, 169, 422/170, 171, 177, 180, 105, 111
See application file for complete search history.

(56) References Cited

U.S. PATENT DOCUMENTS

| 5,900,042 | A | 5/1999 | Mendelsohn et al. |
|---|---|---|---|
| 6,638,485 | B1 | 10/2003 | Iida et al. |
| 6,913,737 | B2 | 7/2005 | Honjo et al. |
| 6,960,329 | B2 | 11/2005 | Sellakumar |
| 7,622,092 | B2 * | 11/2009 | Honjo et al. ............ 423/210 |
| 2005/0147549 | A1 | 7/2005 | Lissinaski et al. |
| 2007/0202020 | A1 | 8/2007 | Honjo et al. |
| 2010/0183493 | A1* | 7/2010 | Nochi et al. ............ 423/239.1 |

FOREIGN PATENT DOCUMENTS

| JP | 61-255993 A | 11/1986 |
|---|---|---|
| JP | 62-44052 U | 3/1987 |
| JP | 10-230137 A | 9/1998 |
| JP | 2001-141193 A | 5/2001 |
| JP | 2001-198434 A | 7/2001 |
| JP | 2007-167743 A | 7/2007 |
| JP | 2008-221087 A | 9/2008 |

OTHER PUBLICATIONS

International Search Report of PCT/JP2009/061028, dated Sep. 15, 2009.

* cited by examiner

*Primary Examiner* — Timothy C Vanoy
(74) *Attorney, Agent, or Firm* — Westerman, Hattori, Daniels & Adrian, LLP

(57) ABSTRACT

A mercury reduction system according to the present embodiment is a mercury reduction system that reduces NOx and Hg in flue gas discharged from a boiler, and includes a chemical supplying unit that mixes an $NH_4Cl$ solution, an $NH_3$ solution, and an HCl solution in liquid states, and supplies a mixed solution into a flue provided downstream of the boiler, a reduction denitration apparatus that includes a denitration catalyst reducing NOx in the flue gas with $NH_3$ and oxidizing Hg in the presence of HCl, and a wet desulfurization apparatus that reduces Hg oxidized in the reduction denitration apparatus with limestone-gypsum slurry.

26 Claims, 11 Drawing Sheets

MERCURY REDUCTION SYSTEM AND MERCURY REDUCTION METHOD OF FLUE GAS CONTAINING MERCURY

CROSS-REFERENCE TO RELATED APPLICATIONS

This patent document claims the benefit of priority to U.S. Provisional Patent Application Ser. No. 61/223,182, filed on Jul. 6, 2009, which is herein incorporated by reference.

BACKGROUND OF THE INVENTION

1. Field of the Invention

The present invention relates to a mercury reduction system and a mercury reduction method of flue gas containing mercury that reduce mercury in flue gas discharged from a boiler or the like.

2. Description of the Related Art

In coal-fired flue gas and flue gas generated by burning heavy fuel oil may contain dust, sulfur oxide (SOx), and nitrogen oxide (NOx), as well as metallic mercury ($Hg^0$). In recent years, various proposals have been made on methods and apparatuses for treating the metallic mercury, in combination with a denitration apparatus that reduces NOx and a wet desulfurization apparatus that uses an alkali absorbent as a SOx absorbent.

As a method for treating metallic mercury in flue gas, a system in which reduction denitration is carried out by spraying ammonium ($NH_3$) into a flue in the upstream process of a high-temperature denitration apparatus, and oxidizing (chlorinating) mercury on a denitration catalyst to be aqueous hydrogen chloride, by spraying a chlorinating agent such as hydrochloric acid (HCl), and then reducing mercury by a wet desulfurization apparatus installed in the downstream side has been proposed (for example, see Patent Document 1).

FIG. 11 is a schematic of a conventional flue gas control system including a mercury reduction system. As shown in FIG. 11, in a flue gas control system 100 including a mercury reduction system, flue gas 102 containing NOx and Hg discharged from a boiler 101 is supplied to a reduction denitration apparatus 103, in which NOx is reduced. The heat of the flue gas 102 is exchanged with air by an air heater 104, and the flue gas 102 is supplied to a dust collector 106, after the heat is collected by a heat collector 105. A desulfurization apparatus 107 reduces sulfur oxide in the flue gas 102, and discharges as purified gas 108. The gas is then heated by a reheater 109 and discharged from a stack 110.

An $NH_3$ injection spot 111 is provided upstream of the reduction denitration apparatus 103, and nitrogen oxide is reduced by $NH_3$ supplied from an $NH_3$ tank 112.

A hydrogen chloride concentration measuring unit 113 installed upstream of a denitration apparatus 107 in a flue measures the concentration of hydrogen chloride (HCl) used as a mercury chlorinating agent, and a mercury concentration measuring unit 114 installed downstream of the denitration apparatus 107 measures the concentration of mercury. Based on the measured concentration values of HCl and Hg, an arithmetic unit 117 calculates the supply of aqueous hydrogen chloride (HCl) solution 116 supplied from a hydrogen chloride solution tank 115. Based on the calculated initial concentration, a controlling unit 118 controls the supply of the evaporated hydrogen chloride (HCl gas) supplied into a flue 120 from the hydrogen chloride solution tank 115 through an HCl injection spot 119.

$NH_3$, urea (($NH_2)_2CO$), and the like are supplied as a reducing agent and HCl is supplied as a mercury chlorinating agent. Accordingly, on a denitration catalyst filled into the reduction denitration apparatus 103, $NH_3$ promotes the reduction reaction of nitrogen oxide NOx in the flue gas 102 as the following formula (1), and HCl promotes the oxidation reaction of Hg as the following formula (2).

$$4NO + 4NH_3 + O_2 \rightarrow 4N_2 + 6H_2O \tag{1}$$

$$Hg + 1/2O_2 + 2HCl \rightarrow HgCl_2 + H_2O \tag{2}$$

In the conventional method, the reducing agent and the mercury chlorinating agent are not only supplied in a gaseous state as $NH_3$ gas and HCl gas, but also supplied in a liquid state as an $NH_4Cl$ solution. When the agents are supplied in a liquid state as $NH_4Cl$ solution, $NH_4Cl$ is dissociated into $NH_3$ gas and HCl gas. Accordingly, $NH_3$ gas acts as a reducing agent and HCl gas acts as a mercury chlorinating agent.

Patent Document 1: Japanese Patent Application Laid-open No. 10-230137

However, if the reducing agent and the mercury chlorinating agent are supplied in a gaseous state as $NH_3$ gas and HCl gas, there poses a problem that gas supply equipment such as a spraying nozzle is separately required for two systems.

When the reducing agent and the mercury chlorinating agent are supplied in a liquid state as $NH_4Cl$ solution, if $NH_4Cl$ is dissociated, $NH_3$ gas and HCL gas generated from 1 mol of $NH_4Cl$ are 1 mol each. Accordingly, the generating amount of $NH_3$ gas and HCl gas cannot be controlled. Consequently, if the required ratio of $NH_3$ and HCl is not one-to-one, due to the gaseous nature of NOx and metallic mercury $Hg^0$ in the flue gas, there poses a problem that at least one of $NH_3$ or HCl may exceed or fall short.

The present invention is made in view of the foregoing, and has an object to provide a mercury reduction system and a mercury reduction method of flue gas containing mercury that can simultaneously supply a reducing agent and a mercury chlorinating agent in any proportion with a simple device.

SUMMARY OF THE INVENTION

According to an aspect of the present invention, a mercury reduction system that reduces nitrogen oxide and mercury in flue gas discharged from a boiler includes: a chemical supplying unit that mixes at least two or more of a reducing agent for reducing nitrogen oxide in the flue gas on a denitration catalyst, a mercury chlorinating agent for oxidizing mercury in a presence of hydrogen chloride, and an oxidation-reduction agent for reducing nitrogen oxide in the flue gas on a denitration catalyst and for oxidizing mercury in the presence of hydrogen chloride, all in liquid states or all in gaseous states, and supplies a resultant mix into a flue of the boiler; a reduction denitration apparatus that includes a denitration catalyst for reducing nitrogen oxide in the flue gas with ammonia and for oxidizing mercury in the presence of hydrogen chloride; and a wet desulfurization apparatus that reduces mercury oxidized in the reduction denitration apparatus with an alkali absorbent.

Advantageously, in the mercury reduction system, the reducing agent, the mercury chlorinating agent, and the oxidation-reduction agent are liquid materials, and the chemical supplying unit sprays a mixed solution obtained by mixing at least two or more of the liquid materials in a liquid state.

Advantageously, in the mercury reduction system, the oxidation-reduction agent is an ammonium halide.

Advantageously, in the mercury reduction system, the reducing agent is ammonia or urea.

Advantageously, in the mercury reduction system, the mercury chlorinating agent is a hydrogen halide.

Advantageously, in the mercury reduction system, the chemical supplying unit includes a chemical feed pipe that feeds the liquid materials into a flue in a liquid state, a blow pipe that is inserted into the flue so as to surround the chemical feed pipe, and has an injection hole used to inject air supplied therein into the flue, and an injection nozzle that is fitted to an end of the chemical feed pipe and through which the liquid materials are injected, and the liquid materials are sprayed into the flue accompanied with the air.

Advantageously, in the mercury reduction system, the injection nozzle is a two-fluid nozzle through which the liquid materials and the air for spraying the liquid materials are injected.

Advantageously, in the mercury reduction system, the chemical supplying unit includes an oxidation-reduction agent feed pipe through which the oxidation-reduction agent is supplied into the flue in a liquid state, an air feed pipe that is inserted into the flue so as to surround the oxidation-reduction agent feed pipe and through which air for spraying the oxidation-reduction agent is supplied into the flue, and a two-fluid nozzle that is fixed to an end of the oxidation-reduction agent feed pipe and the air feed pipe, and through which the oxidation-reduction agent and the air are injected. The oxidation-reduction agent is sprayed into the flue accompanied with the air.

Advantageously, in the mercury reduction system, the reducing agent and the mercury chlorinating agent are gaseous materials, and the chemical supplying unit injects mixed gas obtained by mixing at least two or more of the gaseous materials.

Advantageously, in the mercury reduction system, the reducing agent is ammonia.

Advantageously, in the mercury reduction system, the mercury chlorinating agent is a hydrogen halide.

Advantageously, in the mercury reduction system, temperature of the flue gas is equal to or more than 320° C. and equal to or less than 420° C.

Advantageously, the mercury reduction system further includes a nitrogen oxide concentration meter that is provided upstream and downstream of the reduction denitration apparatus, and measures concentration of nitrogen oxide in the flue gas.

Advantageously, the mercury reduction system further includes an ammonia supplying unit that is provided between the chemical supplying unit and the reduction denitration apparatus, and supplies ammonia into the flue.

Advantageously, the mercury reduction system further includes a hydrogen chloride supplying unit that is provided between the chemical supplying unit and the reduction denitration apparatus, and supplies hydrogen chloride into the flue.

According to another aspect of the present invention, a mercury reduction method of flue gas containing mercury for reducing nitrogen oxide and mercury in flue gas discharged from a boiler includes: a step of chemical supplying for mixing at least two or more of a reducing agent that reduces nitrogen oxide in the flue gas on a denitration catalyst, a mercury chlorinating agent that oxidizes mercury in a presence of hydrogen chloride, and an oxidation-reduction agent that reduces nitrogen oxide in the flue gas on a denitration catalyst and oxidizes mercury in the presence of hydrogen chloride, as in liquid states or all in gaseous states, and for supplying a resultant mix into a flue of the boiler; a step of reduction denitration treating for reducing nitrogen oxide in the flue gas on the denitration catalyst with ammonia and oxidizing mercury in the presence of hydrogen chloride; and a step of wet desulfurizing for reducing mercury oxidized at the step of reduction denitration treating with an alkali absorbent.

Advantageously, in the mercury reduction method of flue gas containing mercury, the reducing agent, the mercury chlorinating agent, and the oxidation-reduction agent are liquid materials, and a mixed solution obtained at the step of chemical supplying by mixing at least two or more of the liquid materials is sprayed in liquid states.

Advantageously, in the mercury reduction method of flue gas containing mercury, the oxidation-reduction agent is an ammonium halide.

Advantageously, in the mercury reduction method of flue gas containing mercury, the reducing agent is ammonia or urea.

Advantageously, in the mercury reduction method of flue gas containing mercury, the mercury chlorinating agent is a hydrogen halide.

Advantageously, in the mercury reduction method of flue gas containing mercury, the liquid materials are sprayed with a two-fluid nozzle at the step of chemical supplying.

Advantageously, in the mercury reduction method of flue gas containing mercury further includes: a step of nitrogen oxide concentration measuring that is provided prior to and subsequent to the step of reduction denitration treating, and measures concentration of nitrogen oxide in the flue gas; and a step of mercury concentration measuring that is provided subsequent to the step of reduction denitration treating, and measures concentration of mercury in the flue gas. Concentrations of the liquid materials in the mixed solution are adjusted based on at least one of the concentration of nitrogen oxide in the flue gas obtained at the step of nitrogen oxide concentration measuring and the concentration of mercury in the flue gas obtained at the step of mercury concentration measuring, or both of them.

Advantageously, in the mercury reduction method of flue gas containing mercury, concentrations of the liquid materials in the mixed solution are measured, and supplies of the liquid materials are adjusted based on the concentrations of the liquid materials.

Advantageously, in the mercury reduction method of flue gas containing mercury, the reducing agent and the mercury chlorinating agent are gaseous materials, and mixed gas obtained by mixing at least two or more of the gaseous materials is sprayed at the step of chemical supplying.

Advantageously, in the mercury reduction method of flue gas containing mercury, the gaseous material used as the reducing agent is ammonia.

Advantageously, in the mercury reduction method of flue gas containing mercury, the mercury chlorinating agent is a hydrogen halide.

DETAILED DESCRIPTION OF THE INVENTION

First Embodiment

Exemplary embodiments of the present invention will be described in detail with reference to the accompanying drawings. However, the present invention is not limited by the embodiments. Constituting elements in the embodiments include elements that can be easily achieved by a person skilled in the art, or elements being substantially the same as those elements.

A mercury reduction system according to a first embodiment of the present invention will be described with reference to the accompanying drawings.

Figure 1:
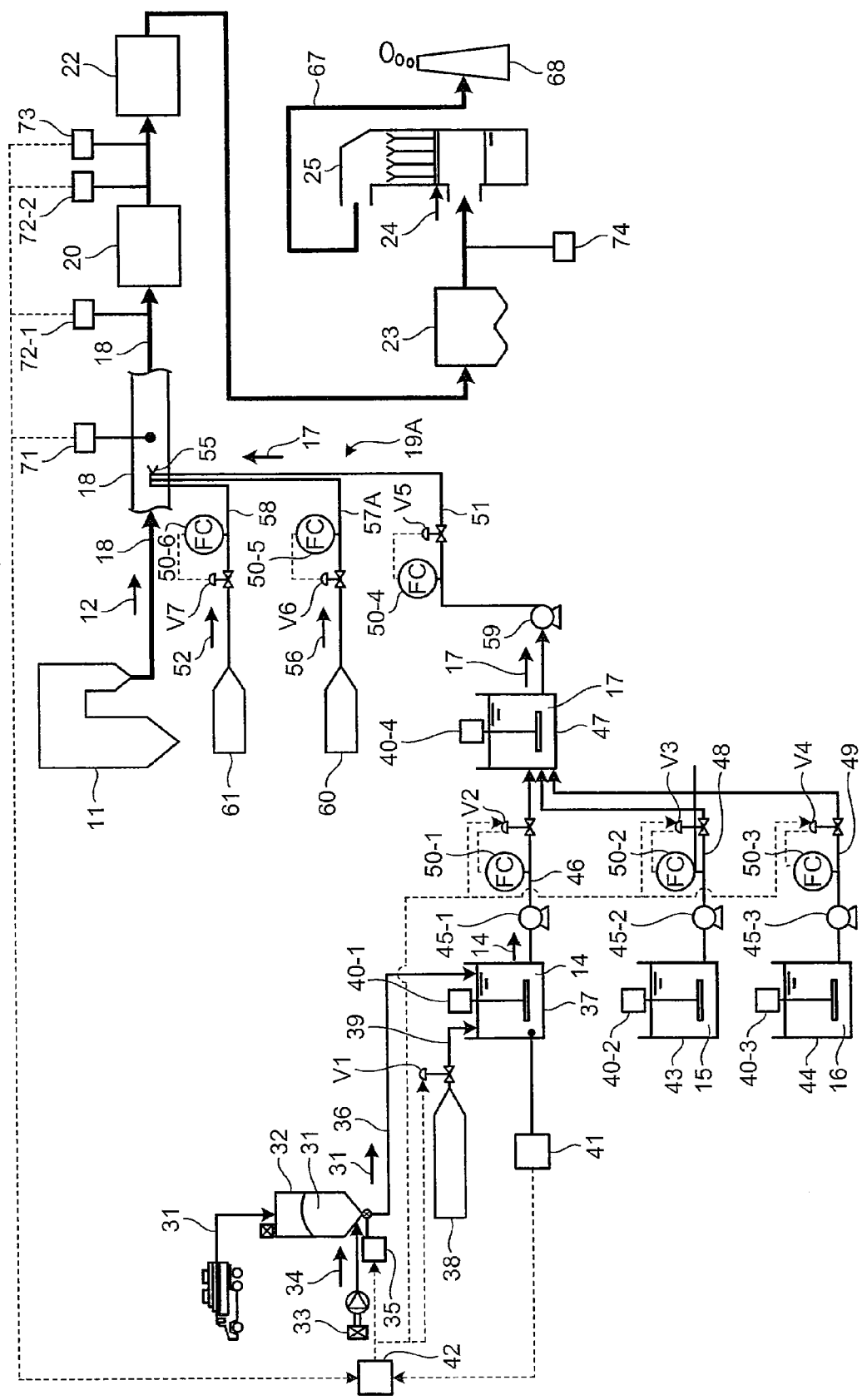
FIG. 1 is a schematic of a mercury reduction system according to a first embodiment of the present invention.
Figure 2:
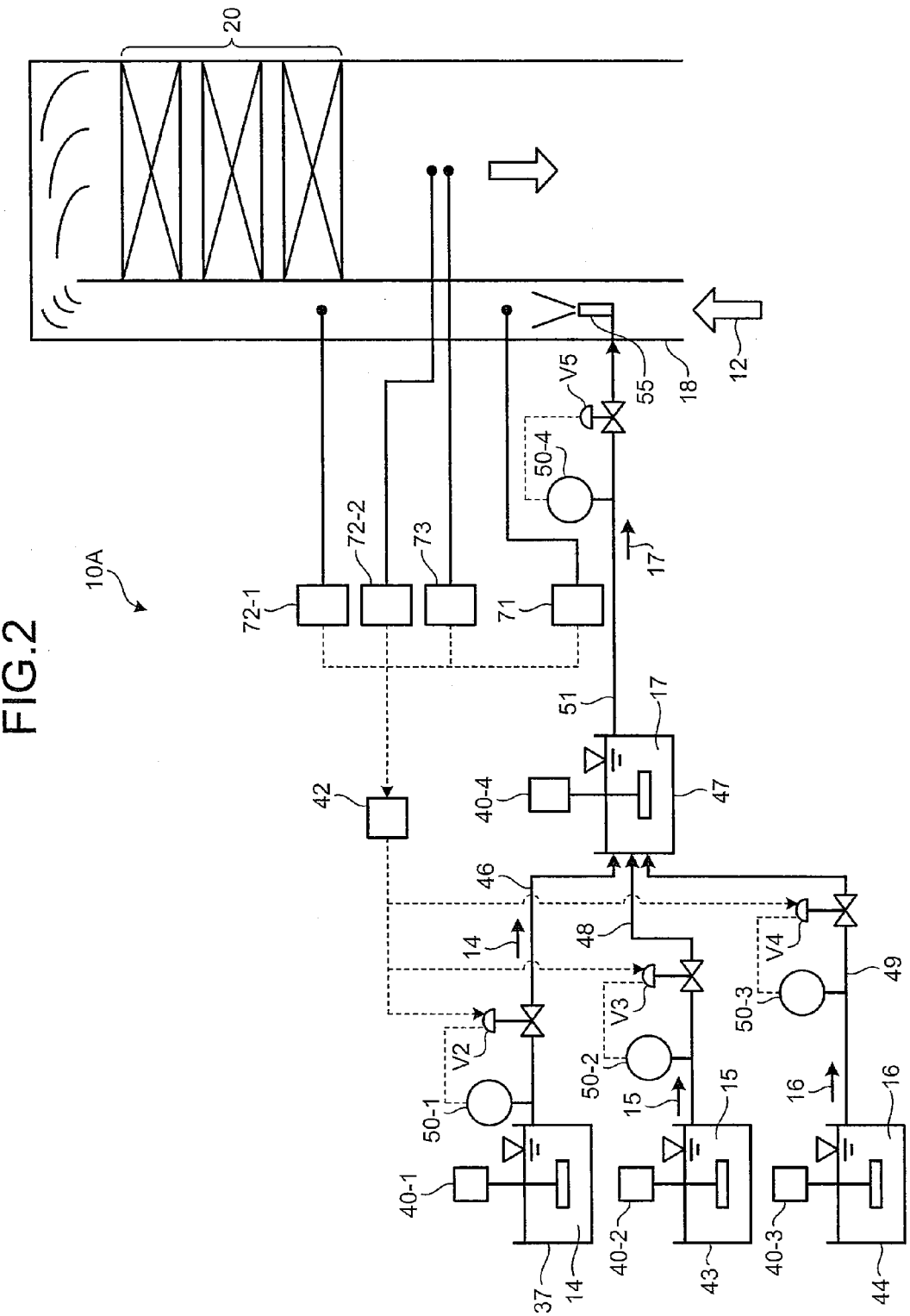
FIG. 2 is a schematic of a part of the structure of the mercury reduction system.

FIG. 1 is a schematic of the mercury reduction system according to the first embodiment of the present invention. FIG. 2 is a schematic of a part of the structure of the mercury reduction system.

As shown in FIGS. 1 and 2, a mercury reduction system 10A according to the present embodiment is a mercury reduction system that reduces nitrogen oxide (NOx) and mercury (Hg) in flue gas 12 discharged from a boiler 11. The mercury reduction system 10A includes a chemical supplying unit 19A that mixes an ammonium chloride ($NH_4Cl$) solution 14 obtained by dissolving ammonium chloride ($NH_4Cl$) used as an oxidation-reduction agent, an ammonia ($NH_3$) solution 15 obtained by dissolving ammonia ($NH_3$) used as a reducing agent, and a hydrogen chloride (HCl) solution 16 obtained by dissolving hydrogen chloride (HCl) used as a mercury chlorinating agent in liquid states, and supplies a mixed solution 17 thereof into a flue 18 provided downstream of the boiler 11. The mercury reduction system 10A also includes a reduction denitration apparatus 20 that has a denitration catalyst reducing NOx in the flue gas 12 with $NH_3$ and oxidizing Hg in the presence of HCl, an air heater (APH) 22 that heat exchanges the denitrated flue gas 12, a dust collector 23 that reduces dust in the denitrated flue gas 12, and a wet desulfurization apparatus 25 that reduces Hg oxidized in the reduction denitration apparatus 20 with limestone-gypsum slurry 24 as an alkali absorbent.

In the present invention, the oxidation-reduction agent is an agent for reducing NOx in the flue gas on a denitration catalyst, and oxidizing Hg in the presence of HCl. The oxidation-reduction agent functions as an oxidizing agent for oxidizing and chlorinating Hg in the presence of HCl on the denitration catalyst, and a reducing agent for reducing $NH_3$. The reducing agent is an agent for reducing NOx in the flue gas on a denitration catalyst. The mercury chlorinating agent is an agent for oxidizing Hg in the presence of HCl.

<Chemical Supplying Unit>

The chemical supplying unit 19A adjusts the mixed solution 17 by mixing the $NH_4Cl$ solution 14, the $NH_3$ solution 15, and the HCl solution 16 in any proportion in liquid states, and supplies the adjusted mixed solution 17 into the flue 18 of the boiler 11.

(Adjusting $NH_4Cl$ Solution)

The $NH_4Cl$ solution 14 used as an oxidation-reduction agent is adjusted to a predetermined concentration. Ammonium chloride ($NH_4Cl$) powder 31 is conveyed and supplied to a silo 32 in which the $NH_4Cl$ powder is temporarily retained. A blower 33 supplies air 34 to the $NH_4Cl$ powder 31 in the silo 32 and prevents the $NH_4Cl$ powder 31 from drying and fixed in the silo 32. A predetermined amount of the $NH_4Cl$ powder 31 in the silo 32 is supplied to an $NH_4Cl$ powder feed path 36 from the silo 32 by a feeder 35 and fed into an $NH_4Cl$ dissolving tank 37. A water supplying tank 38 feeds water 39 into the $NH_4Cl$ dissolving tank 37. The $NH_4Cl$ dissolving tank 37 includes a stirring unit 40-1, and the $NH_4Cl$ powder 31 supplied into the $NH_4Cl$ dissolving tank 37 is dissolved in the water 39, thereby generating mixed solution 17 of a predetermined concentration. The stirring unit 40-1 keeps the concentration of the mixed solution 17 constant. The amount of water 39 supplied from the water supplying tank 38 is adjusted with an adjusting valve V1.

Figure 3:
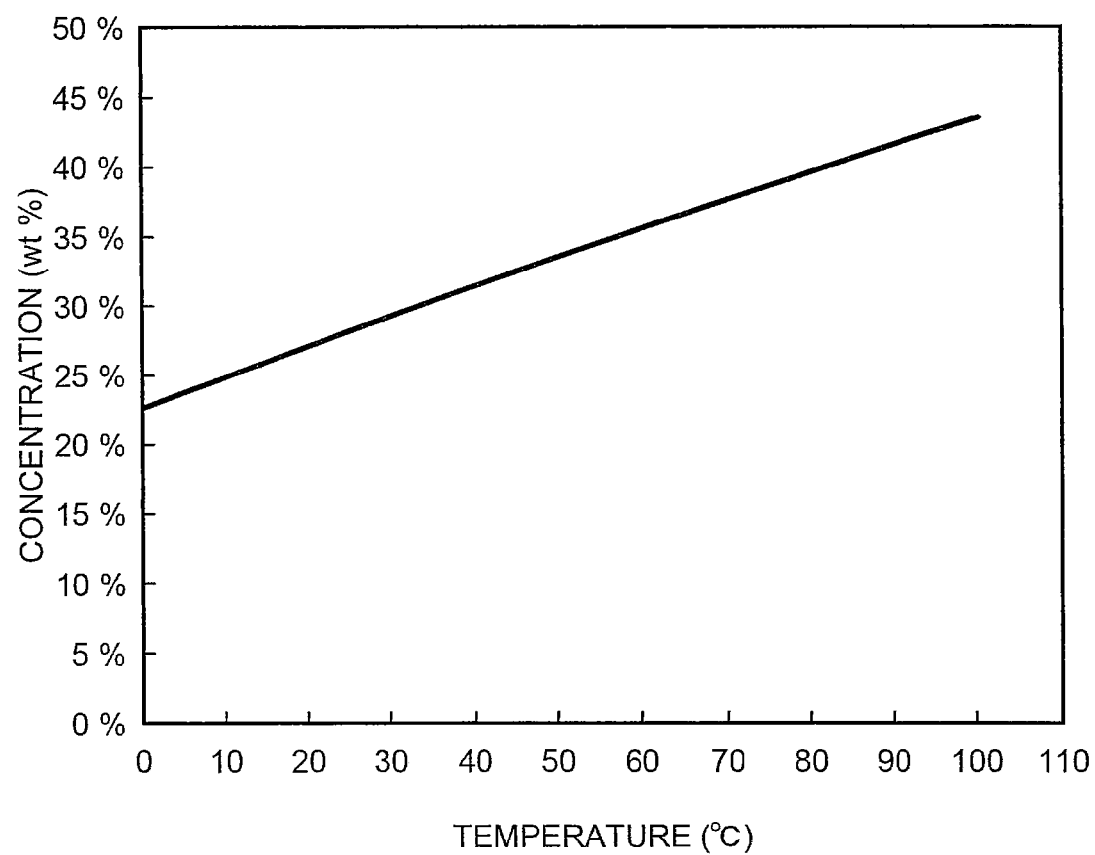
FIG. 3 is a schematic of relationship between the temperature of $NH_4Cl$ and the saturation concentration in water.

The concentration of the $NH_4Cl$ solution 14 is preferably more than 0 wt % and equal to or less than 43 wt %, more preferably equal to or more than 10 wt % and equal to or less than 23 wt %, more preferably equal to or more than 18 wt % and equal to or less than 23 wt %, and most preferably about 20 wt %. This is because, the $NH_4Cl$ powder 31 needs to be dissolved in the water 39 at least at room temperature (for example, at around 20° C.), and the concentration of the $NH_4Cl$ solution 14 should be equal to or less than saturation concentration of $NH_4Cl$ in water. FIG. 3 is a schematic of the relationship between the temperature of $NH_4Cl$ and the saturation concentration in water. As shown in FIG. 3, if the temperature of the solution is about 0° C., the saturation concentration of the $NH_4Cl$ powder 31 dissolved in the water 39 is about 23 wt, and if the temperature is about 100° C., the saturation concentration of the $NH_4Cl$ powder 31 dissolved in the water 39 is about 43 wt %. Accordingly, the concentration of the $NH_4Cl$ solution 14 needs to be more than 0 wt % and equal to or less than 43 wt %.

(Controlling the Concentration of $NH_4Cl$ Solution)

The $NH_4Cl$ solution 14 in the $NH_4Cl$ dissolving tank 37 is measured by a concentration meter 41 and the measured concentration value of the $NH_4Cl$ solution 14 is transmitted to an arithmetic apparatus 42. The arithmetic apparatus 42 determines the supplies of the $NH_4Cl$ powder 31 and the water 39, based on the concentration of the $NH_4Cl$ solution 14. The arithmetic apparatus 42 transmits control signals to the feeder 35 and the adjusting valve V1, and adjusts the supplies of the $NH_4Cl$ powder 31 and the water 39. The concentration of the $NH_4Cl$ solution 14 in the $NH_4Cl$ dissolving tank 37 is adjusted so as to fall within a range more than 0 wt % and equal to or less than 43 wt %.

(Adjusting $NH_3$ Solution)

The $NH_3$ solution 15 obtained by dissolving $NH_3$ and used as a reducing agent, is adjusted in an $NH_3$ dissolving tank 43. The concentration of $NH_3$ is preferably adjusted, for example, so as to fall within a range larger than 0 wt % and equal to or less than 28 wt %. The $NH_3$ dissolving tank 43 includes a stirring unit 40-2, and the stirring unit 40-2 keeps the concentration of $NH_3$ in the $NH_3$ solution 15 constant.

(Adjusting HCl Solution)

The HCl solution 16 obtained by dissolving HCl and used as an oxidation-reduction agent, is adjusted in an HCl dissolving tank 44. The concentration of HCl is preferably adjusted, for example, so as to fall within a range larger than 0 wt % and equal to or less than 38 wt %. The HCl dissolving tank 44 includes a stirring unit 40-3, and the stirring unit 40-3 keeps the concentration of HCl in the HCl solution 16 constant.

A pump 45-1 feeds the $NH_4Cl$ solution 14 into a mixed solution dissolving tank 47 from an $NH_4Cl$ dissolving tank 37 through an $NH_4Cl$ solution feed pipe 46. A pump 45-2 feeds the $NH_3$ solution 15 into the mixed solution dissolving tank 47 from the $NH_3$ dissolving tank 43 through an $NH_3$ solution feed pipe 48. A pump 45-3 feeds the HCl solution 16 into the mixed solution dissolving tank 47 from the HCl dissolving tank 44 through an HCl solution feed pipe 49. Accordingly, the mixed solution dissolving tank 47 retains the solutions.

The $NH_4Cl$ solution feed pipe 46, the $NH_3$ solution feed pipe 48, and the HCl solution feed pipe 49 include flowmeters 50-1 to 50-3 that measure the flow rates of the $NH_4Cl$ solution 14, the $NH_3$ solution 15, and the HCl solution 16, and adjusting valves V2 to V4 that adjust the flow rates of the $NH_4Cl$ solution 14, the $NH_3$ solution 15, and the HCl solution 16, respectively. The flow rates of the $NH_4Cl$ solution 14, the $NH_3$ solution 15, and the HCl solution 16 are measured by the flowmeters 50-1 to 50-3, and the supplies of the $NH_4Cl$ solution 14, the $NH_3$ solution 15, and the HCl solution 16 are adjusted with the adjusting values V2 to V4. The mixed solution dissolving tank 47 includes a stirring unit 40-4, and the stirring unit 40-4 keeps the concentrations of $NH_4Cl$, $NH_3$, and HCl in the mixed solution 17 constant.

In the mercury reduction system 10A according to the present embodiment, the chemical supplying unit 19A includes an mixed solution feed pipe 51 for supplying the mixed solution 17 into the flue 18 in a liquid state, a blow pipe 54 (see FIGS. 4 and 5) that is inserted into the flue 18 so as to surround the mixed solution feed pipe 51 and has an injection hole 53 (see FIG. 5) from which air 52 supplied inside is injected into the flue 18, and a two-fluid nozzle 55 that is attached to an end of the mixed solution feed pipe 51 and injects the mixed solution 17. The chemical supplying unit 19A includes an air feed pipe 57A connected to the two-fluid nozzle 55 for supplying air 56 used for compressing and spraying the $NH_4Cl$ solution 14, and an air feed pipe 58 connected to the blow pipe 54 (see FIG. 4) for supplying the air 52 used for compressing and spraying the $NH_4Cl$ solution 14 into the blow pipe 54. In FIG. 1, the air feed pipe 58 is inserted into the flue 18. However, the air feed pipe 58 is connected to the blow pipe 54 (see FIG. 4).

Figure 4:
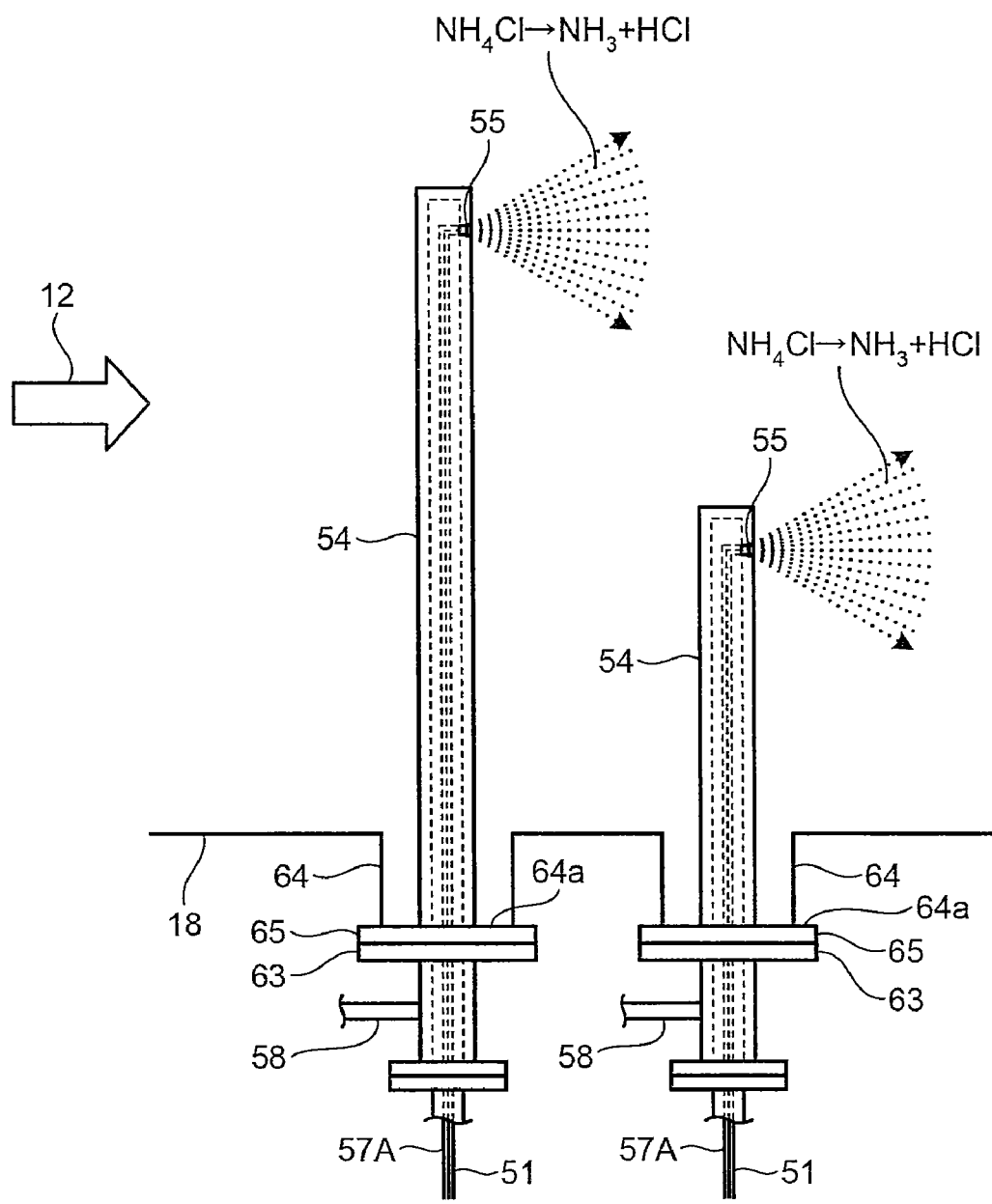
FIG. 4 is a schematic of flues in which a mixed solution feed pipe and an air feed pipe are inserted, and near the flues.
Figure 5:
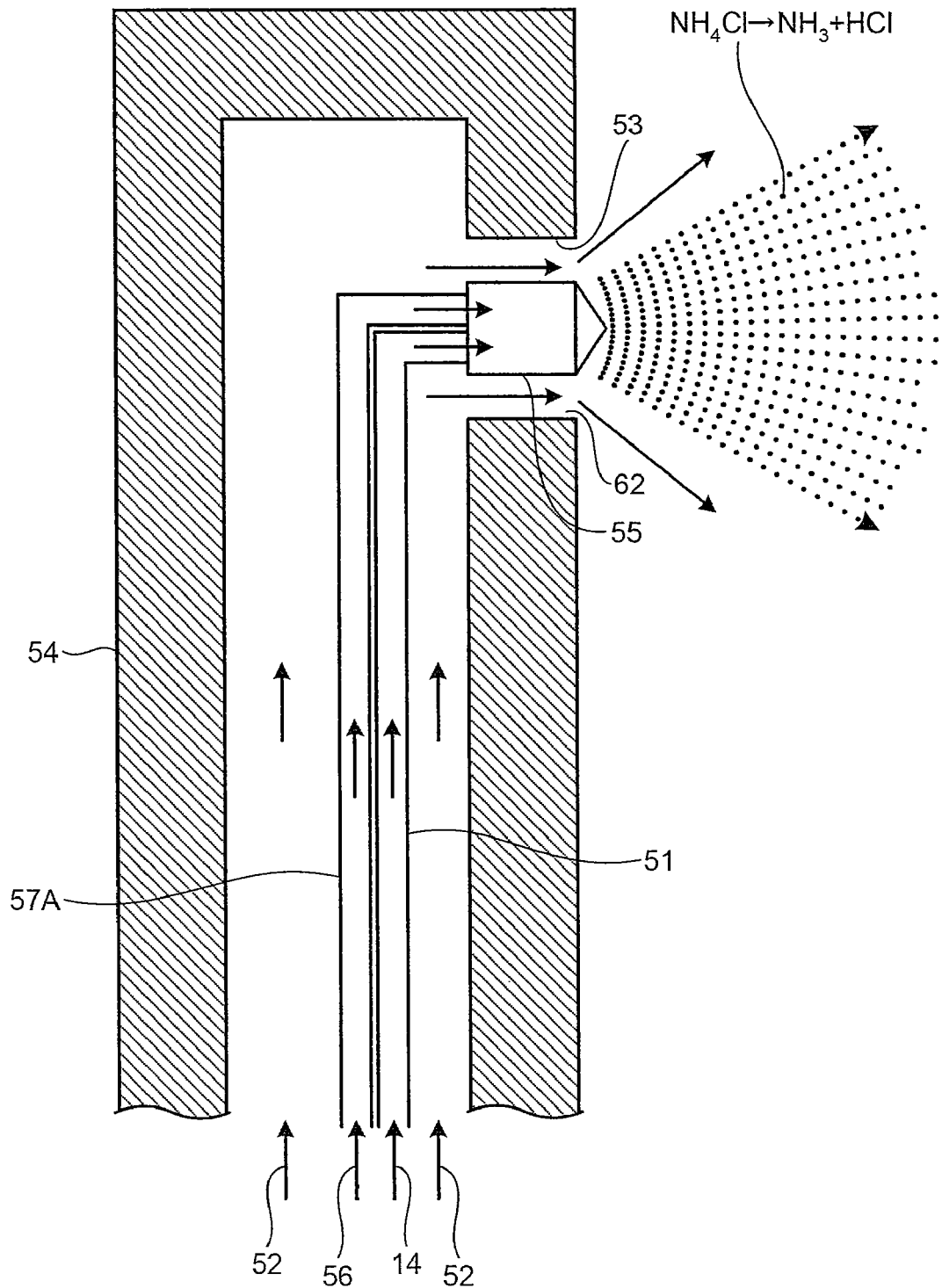
FIG. 5 is a partially enlarged sectional view of FIG. 4.

FIG. 4 is a schematic of flues in which the $NH_4Cl$ solution feed pipe and the air feed pipe are inserted and near the flues. FIG. 5 is a partially enlarged sectional view of FIG. 4. As shown in FIG. 4, the blow pipe 54 is inserted into the flue 18 so as to surround the mixed solution feed pipe 51 and the air feed pipe 57A. As shown in FIG. 5, the mixed solution feed pipe 51 is provided so as to be adjacent to the air feed pipe 57A in the blow pipe 54. The two-fluid nozzle 55 is provided in the injection hole 53 at the wall surface of the blow pipe 54, and connected to the mixed solution feed pipe 51 and the air feed pipe 57A. The mixed solution 17 injected from the two-fluid nozzle 55 is sprayed by the air 56, and the mixed solution 17 is further sprayed into the flue 18, accompanied with the air 52 injected from the injection hole 53.

The mixed solution 17 in the mixed solution dissolving tank 47 is fed to a two-fluid nozzle 55 though a mixed solution feed pipe 51, by a feed pump 59. A flowmeter 50-4 measures the flow rate of the mixed solution 17 in the mixed solution feed pipe 51, and an adjusting valve V5 adjusts the supply of the mixed solution 17.

Air 56 is fed to the two-fluid nozzle 55 from an air supplying unit 60 through an air feed pipe 57A, and used as compressed air for spraying the mixed solution 17 from the two-fluid nozzle 55. Accordingly, the mixed solution 17 injected from the two-fluid nozzle 55 can be sprayed as fine liquid droplets. As shown in FIG. 1, a flowmeter 50-5 measures the flow rate of the air 56 supplied from the air supplying unit 60, and an adjusting valve V6 adjusts the flow rate. The size of the liquid droplets of the mixed solution 17 sprayed from the two-fluid nozzle 55 can be adjusted, by the flow rate of the air 56.

The flow rate of the air 56 injected from the two-fluid nozzle 55, for example, is preferably made at an air-water ratio of equal to or more than 100 and equal to or less than 10000 (volume ratio). This is to spray the mixed solution 17 injected from the two-fluid nozzle 55 into the flue 18, in fine liquid droplets.

An air supplying unit 61 feeds the air 52 into the blow pipe 54 through the air feed pipe 58, and the air 52 is used as compressed air for dispersing the liquid droplets of the mixed solution 17 sprayed from the two-fluid nozzle 55. As shown in FIG. 1, the flow rate of the air 52 supplied from the air supplying unit 61 is measured by a flowmeter 50-6, and adjusted with a adjusting valve V7. The air 52 is injected from a space 62 between the injection hole 53 of the blow pipe 54 and the two-fluid nozzle 55. Because the air 52 is injected from the space 62, the liquid droplets of the mixed solution 17 sprayed from the two-fluid nozzle 55 can be dispersed into the flue 18 further more.

The air 52 injected from the injection hole 53 is used to prevent the mixed solution 17 injected from the two-fluid nozzle 55 from being fixed to the blow pipe 54, and to prevent the temperature in the blow pipe 54 from increasing. Accordingly, the $NH_4Cl$ solution 14 is prevented from boiling and ammonium chloride particles are prevented from depositing.

The air 52 flows between the blow pipe 54 and the mixed solution feed pipe 51. Accordingly, the air 52 acts as air for cooling the $NH_4Cl$ solution 14, and prevents the heat of the flue gas 12 in the flue 18 from being transmitted into the mixed solution feed pipe 51 from the outside of the blow pipe 54. Because the temperature in the blow pipe 54 is prevented from increasing and the mixed solution 17 is prevented from being heated, the mixed solution 17 is prevented from boiling in the blow pipe 54, thereby keeping the liquid state of the mixed solution 17 up to when the mixed solution 17 is injected. It is also possible to prevent the two-fluid nozzle 55 from corroding.

Because the temperature in the blow pipe 54 can be prevented from increasing, a metal material can be used for the mixed solution feed pipe 51 and the air feed pipe 57A. The material for the mixed solution feed pipe 51 and the air feed pipe 57A may be, for example, as follows: The mixed solution feed pipe 51 may be a corrosion resistant metal such as a nickel based heat resistant and corrosion resistant alloy like Hastelloy C, and a resin-lined steel pipe (low temperature portion). The air feed pipe 57A may be carbon steel, stainless-steel, and the like. The material for the mixed solution feed pipe 51 and the air feed pipe 57A is not limited to the metal material. Because the mixed solution 17 can be supplied into the flue 18 from the dissolved mixed solution dissolving tank 47 in a room temperature, an inexpensive resin or a resin-lined pipe can be used as a material for the mixed solution feed pipe 51 and the blow pipe 54.

In the mercury reduction system 10A according to the present embodiment, for example, the number of the two-fluid nozzle 55 provided in the flue 18 is equal to or less than a few to a few tens. Conventionally, the number of generally used $NH_3$ grid provided in the flue 18, for example, is from a few hundreds to a few thousands. Alternatively, the number of the two-fluid nozzle 55 in the flue 18 is only from a few to a few tens, and the two-fluid nozzle 55 is fixed by flange portions 63 and 65. Accordingly, the nozzle can be replaced easily. In FIG. 4, two pieces of two-fluid nozzles 55 are provided. However, the present invention is not limited thereto, and a plurality of two-fluid nozzles 55 may be provided, based on the installation area in the flue 18.

As shown in FIG. 4, each of blow pipes 54 includes a flange portion 63 at the outside of the flue 18 and at the outer periphery of the blow pipe 54. The flange portion 63 is formed so as to correspond to a flange portion 65 provided at an end 64a of an opening 64 of the flue 18. Because the flange portion 63 of the blow pipe 54 is connected to the flange portion 65 provided at the flue 18, the blow pipe 54 is fixed to the flue 18. The flange portion 63 of the blow pipe 54 and the flange portion 65 of the flue 18 may be fixed by bolts, for example, by providing a plurality of holes at the outer peripheries of the flange portion 63 and the flange portion 65. The blow pipe 54 can be easily inserted and removed into and from the flue 18, by removably connecting the flange portion 63 and the flange portion 65. Accordingly, it is possible to easily maintain the insides of the blow pipe 54 and the flue 18.

The two-fluid nozzle 55 is used for spraying the mixed solution 17. However, the present invention is not limited thereto, and an ordinary injection nozzle for spraying liquid may be used.

Figure 6:
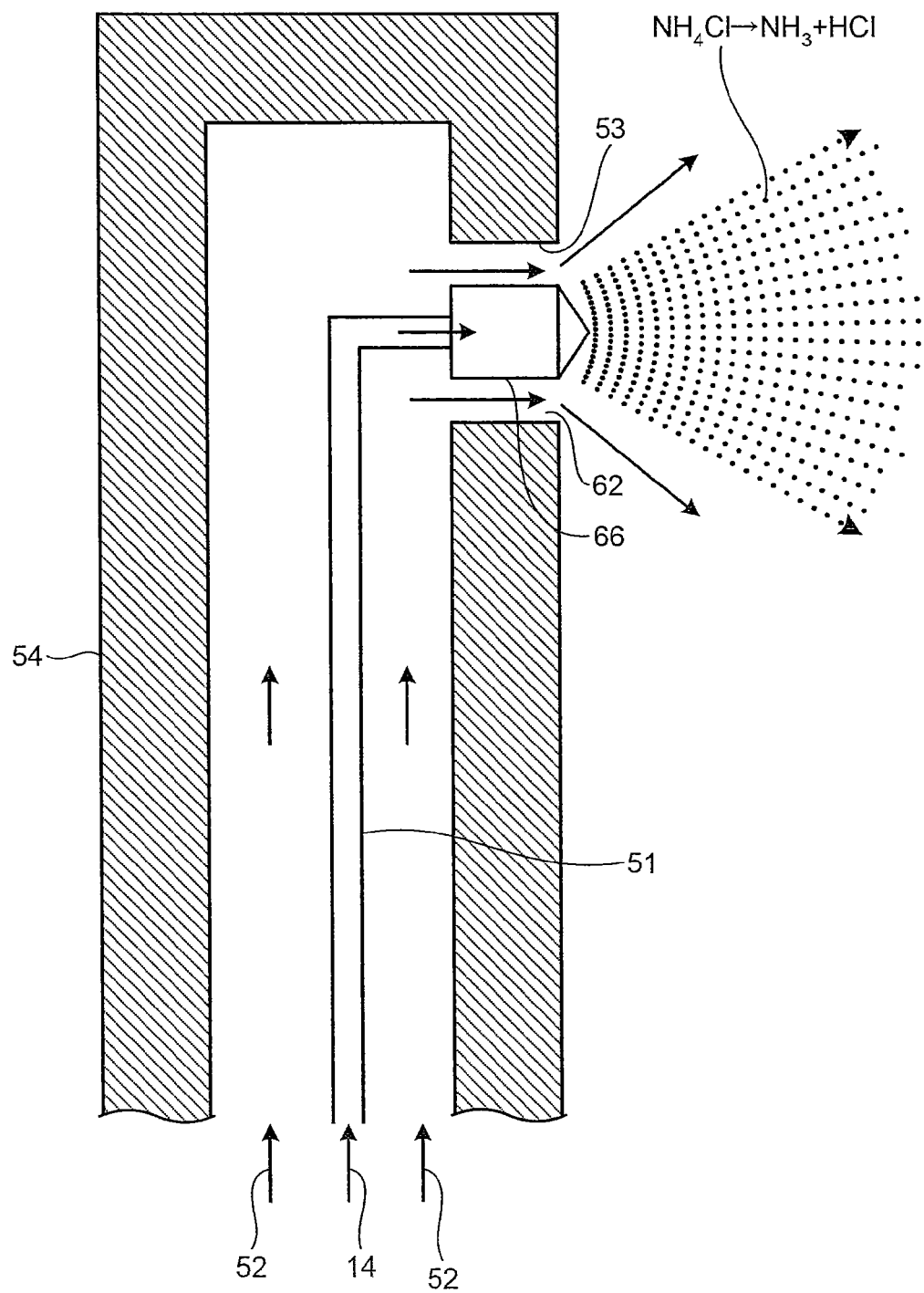
FIG. 6 is a partially enlarged sectional view of a blow pipe with an ordinary injection nozzle.

FIG. 6 is a partially enlarged sectional view of a blow pipe with an ordinary injection nozzle. As shown in FIG. 6, if the size of liquid droplets of the mixed solution 17 need not particularly be adjusted, the mixed solution 17 may be injected from an injection nozzle 66 and sprayed into the flue 18, accompanied with the air 52 injected from the injection hole 53.

The blow pipe 54 includes the mixed solution feed pipe 51 and the air feed pipe 57A therein, and the mixed solution 17 is sprayed into the flue 18 from the two-fluid nozzle 55. However, the present invention is not limited thereto. As long as the mixed solution 17 in the mixed solution feed pipe 51 is prevented from being heated, the mixed solution 17 may be sprayed into the flue 18, by connecting the mixed solution feed pipe 51 and the air feed pipe 57A with the two-fluid nozzle 55, without using the blow pipe 54.

Figure 7:
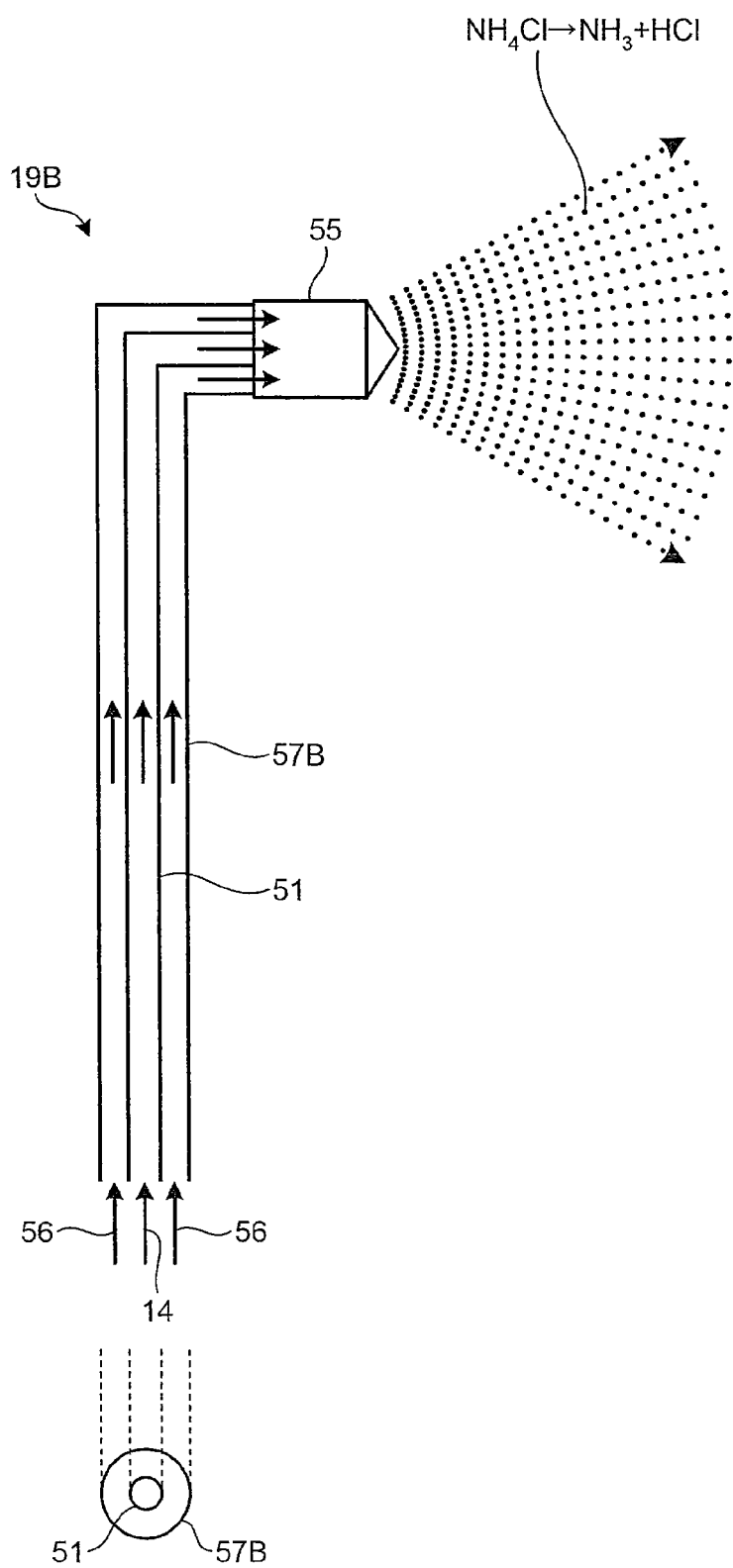
FIG. 7 is a schematic of another spraying method of $NH_4Cl$ solution with a two-fluid nozzle.

FIG. 7 is a schematic of another spraying method of $NH_4Cl$ solution with a two-fluid nozzle. As shown in FIG. 7, a chemical supplying unit 19B has a double pipe structure, and uses the mixed solution feed pipe 51 as an inner pipe, and an air feed pipe 57B as an outer pipe. The mixed solution feed pipe 51 and the air feed pipe 57B are connected to the two-fluid nozzle 55.

In other words, as shown in FIG. 7, the chemical supplying unit 19B includes the $NH_4Cl$ solution feed pipe 46 for supplying the $NH_4Cl$ solution 14 into the flue 18, the air feed pipe 57B inserted into the flue 18 so as to surround the $NH_4Cl$ solution feed pipe 46 for supplying the air 56 for spraying the mixed solution 17 into the flue 18, and the two-fluid nozzle 55 that is fixed to the ends of the mixed solution feed pipe 51 and the air feed pipe 57B and injects the mixed solution 17 and the air 56. Because the air feed pipe 57B surrounds the mixed solution feed pipe 51, the mixed solution 17 in the mixed solution feed pipe 51 is prevented from being heated by the flue gas 12 in the flue 18, due to the air 56 supplied into the air feed pipe 57B. The mixed solution 17 can also be splayed into the flue 18 accompanied with the air 56. Because the chemical supplying unit 19B does not include the blow pipe 54 as shown in FIGS. 4 to 6, the installation of the mixed solution feed pipe 51, the air feed pipe 57B, and the two-fluid nozzle 55 in the flue 18 can be simplified. Because the blow pipe 54 is not included, the mixed solution feed pipe 51, the air feed pipe 57B, and the two-fluid nozzle 55 can be easily replaced.

The air 56 is supplied from the air supplying unit 60 and the air 52 is supplied from the air supplying unit 61, and air is separately supplied from different supplying sources. However, the present invention is not limited thereto, and the air may be supplied from the same supplying source. In other words, the air 52 may be supplied from the air supplying unit 60, and the air 56 may be supplied from the air supplying unit 61.

The temperature of the flue gas 12 in the flue 18, for example, is equal to or more than 320° C. and equal to or less than 420° C., and is very hot. The mixed solution feed pipe 51 is provided in the blow pipe 54, and the air 52 is used to cool the mixed solution 17. Accordingly, the mixed solution 17 is maintained in a liquid state up to when the mixed solution 17 is injected from the two-fluid nozzle 55. Because the mixed solution 17 is sprayed from the two-fluid nozzle 55 in liquid droplets, the liquid droplets of the sprayed mixed solution 17 are evaporated, due to the high ambient temperature of the flue gas 12.

The liquid droplets of the sprayed mixed solution 17 temporarily generate fine $NH_4Cl$ solid particles resulting from the $NH_4Cl$ solution 14 in the mixed solution 17, because the liquid droplets are evaporated by the high ambient temperature of the flue gas 12. As the following formula (1), the liquid droplets are decomposed into HCl gas and $NH_3$ gas, and sublimated. Accordingly, from the liquid droplets of the mixed solution 17 sprayed from the two-fluid nozzle 55, the $NH_4Cl$ solution 14 in the mixed solution 17 is decomposed into HCl gas and $NH_3$ gas, thereby supplying into the flue 18.

$$NH_4Cl \rightarrow NH_3 + HCl \qquad (1)$$

The temperature of the flue gas 12 in the flue 18, for example, is preferably equal to or more than 320° C. and equal to or less than 420° C., more preferably equal to or more than 320° C. and equal to or less than 380° C., and more preferably equal to or more than 350° C. and equal to or less than 380° C. Accordingly, the reduction reaction of NOx and the oxidation reaction of Hg can be simultaneously carried out on a denitration catalyst.

The $NH_3$ concentration and the HCl concentration in the flue gas 12 in the flue 18 are set, relative to the NOx concentration in the flue gas 12, so that the ratio of the molar number of $NH_3$ to the molar number of NOx in the flue gas 12 ($NH_3$//NOx molar ratio) is a value equal to or less than one, based on the required denitration performance.

Although depending on the NOx concentration in the flue gas 12, the mixed solution 17 may be sprayed so as the $NH_3$ concentration and the HCl concentration fall within a range from a few tens to a few hundreds parts per million, or preferably from a few tens to 200 parts per million. This is because $NH_3$ and NOx react at a molar ratio of 1:1, and if $NH_3$ is over-supplied, an excess of $NH_3$ is remained after the reaction. Acid sulfate is produced from $NH_3$ and the components in the flue gas 12. By spraying the mixed solution 17 as the above, it is possible to prevent the inside of the flue 18, the air heater 22, the dust collector 23, and the like, from being corroded and damaged, and from being blocked due to ash deposition. It is also possible to prevent the flue gas 12 from leaking from the damaged flue 18.

The Hg concentration in the flue gas 12 is preferably set in a range equal to or more than 0.1 μg/m³N and equal to or less than a few ten μg/m³N, and relative to the HCl concentration in the flue gas 12, it is preferable to set in a range equal to or less than 1/1000 in molar ratio.

The size of the hole of the two-fluid nozzle 55 is preferably equal to or more than 0.01 millimeter and equal to or less than 10 millimeters, and more preferably equal to or more than 0.1 millimeter and equal to or less than 5 millimeters.

The diameter of the liquid droplets of the mixed solution 17 sprayed from the two-fluid nozzle 55 is preferably fine enough to be equal to or more than 1 nanometer and equal to or less than 100 micrometers on average. By generating the fine liquid droplets of equal to or more than 1 nanometer and equal to or less than 100 micrometers on average, the $NH_4Cl$ solid particles generated from the $NH_4Cl$ solution 14 in the liquid droplets of the sprayed mixed solution 17 can be decomposed into $NH_3$ gas and HCl gas in a short retention time, and sublimated in the flue gas 12. Because the mixed solution 17 does not need to be heated in advance, it is possible to prevent the flue 18 and the two-fluid nozzle 55 from being degraded and corroded.

Accordingly, in the mercury reduction system 10A according to the present embodiment, the mixed solution 17 obtained by mixing the $NH_4Cl$ solution 14, the $NH_3$ solution 15, and the HCl solution 16 is supplied into the flue 18. Consequently, the reduction of NOx as well as the oxidation of Hg can be performed with a single simple device.

By controlling the supplies of the $NH_4Cl$ solution 14, the $NH_3$ solution 15, and the HCl solution 16 that form the mixed solution 17, the supplies of the $NH_4Cl$ solution 14, the $NH_3$ solution 15, and the HCl solution 16 in the mixed solution 17 can be arbitrarily adjusted, based on the gaseous nature such as the concentrations of NOx or Hg in the flue gas 12. Accordingly, the denitration performance of NOx can be satisfied, and the oxidation performance of Hg can be maintained.

The two-fluid nozzle 55 is used as a unit for spraying the mixed solution 17. Because the mixed solution 17 is sprayed from the two-fluid nozzle 55, the $NH_4Cl$ solution 14, the $NH_3$ solution 15, and the HCl solution 16 that form the mixed solution 17 are decomposed into HCl gas and $NH_3$ gas, due to the high ambient temperature of the flue gas 12, thereby supplying into the flue 18. Consequently, a hydrogen chloride vaporizer, a spray grid, a hydrochloric acid solution tank, and the like in a mercury chlorinating agent feed device of the conventional mercury reduction system can be omitted.

An $NH_4Cl$ powder 31 used for adjusting the $NH_4Cl$ solution 14 included in the mixed solution 17 is neutral salt. Accordingly, it is easy to handle, and inexpensive and easy to obtain as can be used as fertilizer. Because $NH_3$ gas can be generated from the $NH_4Cl$ solution 14, the usage of the $NH_3$ gas can be reduced. Because HCl is a dangerous substance, handling costs, such as a cost for transportation, a cost for legislative permission, and a facility cost for safety control are expensive. However, the $NH_4Cl$ powder 31 can significantly reduce the handling cost.

The $NH_4Cl$ solution 14 in the mixed solution 17 is dissolved in water, and fully evaporated into $NH_3$ gas and HCl gas. Because $NH_4Cl$ solid particles resulting from the $NH_4Cl$ solution 14 do not remain, it is possible to prevent the $NH_4Cl$ solid particles from accumulating in the flue 13 and on the denitration catalyst provided in the downstream side. It is also possible to prevent the denitration catalyst from deteriorating.

The mixed solution 17 uses the flue gas 12 as a heat source, and the $NH_4Cl$ solution 14, the $NH_3$ solution 15, and the HCl solution 16 are evaporated into $NH_3$ gas and HCl gas. Accordingly, the installation of sublimation equipment such as a new heat source like steam for evaporating the mixed solution 17, can be omitted. Consequently, it is possible to reduce the retention time of the mixed solution 17 required for evaporating in the flue gas 12.

The flow rate of the mixed solution 17 sprayed from the two-fluid nozzle 55 is only a small amount of a few t/h compared with the amount of the flue gas, for example, of 1,500,000 $m^3N/h$. Accordingly, the temperature of the flue gas 12 can be prevented from lowering, for example, to equal to or less than a few ° C. Consequently, it is possible to prevent SO3 in the flue gas 12 from condensing, and also prevent ash in the flue gas 12 from accumulating and fixing in the flue 18 and the like.

Compared with a mercury reduction system that supplies the solid powder of $NH_4Cl$ into a flue, in other words, that sprays $NH_4Cl$ by crushing the $NH_4Cl$ solid, the mercury reduction system 10A according to the present embodiment can easily reduce the size of the liquid particles of the $NH_4Cl$ solution 14, because the liquid such as the $NH_4Cl$ solution 14 contained in the mixed solution 17 is used. Accordingly, solid particles having the size equal to or less than the sprayed fine liquid droplets can be generated. Consequently, is possible to significantly reduce the time required to decompose the $NH_4Cl$ solution 14.

Because the $NH_4Cl$ powder 31 is used for the $NH_4Cl$ solution 14, $NH_4Cl$ need not be finely crushed as a conventional method, but may be stored in the pellet state and used accordingly.

The supplies of the $NH_4Cl$ powder 31 and the water 39 can be adjusted based on the concentration of the $NH_4Cl$ solution 14. Accordingly, the concentration of the $NH_4Cl$ solution 14 can be adjusted, based on the concentrations of NOx and Hg in the flue gas 12.

The HCl gas and the $NH_3$ gas generated from the liquid droplets of the $NH_4Cl$ solution 14, $NH_3$ solution 15, and HCl solution 16 as shown in FIG. 1, are fed to the reduction denitration apparatus 20 accompanied with the flue gas 12. The $NH_3$ gas generated by decomposing $NH_4Cl$, is used to carry out reduction denitration of NOx in the reduction denitration apparatus 20, and the HCl gas is used to carry out oxidation of Hg. Accordingly, NOx and Hg are reduced from the flue gas 12.

The reduction denitration apparatus 20 is filled with denitration catalyst. On the denitration catalyst, $NH_3$ is used to carry out reduction denitration of NOx as the following formula (2), and HCl is used to carry out oxidation of Hg as the following formula (3).

$$4NO + 4NH_3 + O_2 \rightarrow 4N_2 + 6H_2O \quad (2)$$

$$Hg + 1/2O_2 + 2HCl \rightarrow HgCl_2 + H_2O \quad (3)$$

In the mercury reduction system 10A according to the present embodiment, the $NH_4Cl$ solution 14, the $NH_3$ solution 15, and the HCl solution 16 are mixed as the mixed solution 17. However, the present invention is not limited thereto. $NH_4Cl$ is decomposed into $NH_3$ gas and HCl gas, and generates a reducing agent and a mercury chlorinating agent. Accordingly, only the $NH_4Cl$ solution 14 may be sprayed into the flue 18. It is also possible to mix the $NH_3$ solution 15 and the HCl solution 16 in any proportion, and spray into the flue 18 as a mixed solution.

In the mercury reduction system 10A according to the present embodiment, the chemical supplying unit 19A uses the $NH_4Cl$ solution 14 containing $NH_4Cl$, the $NH_3$ solution 15, and the HCl solution 16 as the mixed solution 17. However, the present invention is not limited thereto. For example, in the present embodiment, $NH_4Cl$ is used as an oxidation-reduction agent. However, an ammonium halide such as ammonium bromide (NH4Br) and ammonium iodide (NH4I), other than $NH_4Cl$ may be used as the oxidation-reduction agent, and use the aqueous solution.

NH$_3$ is used as a reducing agent. However, urea ((H$_2$N)$_2$C=O) and the like with reducing action may be used as the reducing agent, and use the aqueous solution. To adjust the NH$_4$Cl solution 14, for example, not only the NH$_4$Cl powder 31, but urea ((H$_2$N)$_2$C=O) may be mixed by dissolving into water 39, and the aqueous solution in which the NH$_4$Cl powder 31 and the urea are mixed may be used. In a boiler facility, nitrogen oxide concentration may vary. In such an event, the supply of NH$_3$ may be increased, by adding the urea as well as NH$_4$Cl.

HCl is used as a mercury chlorinating agent. However, a hydrogen halide such as hydrogen bromide (HBr) and hydrogen iodide (HI) other than HCl may be used as the mercury chlorinating agent, and use the aqueous solution.

Besides the NH$_3$ solution 15 and the HCl solution 16, at least one or more of a solution in which the oxidation-reduction agent is dissolved, a solution in which the reducing agent is dissolved, and a solution in which the mercury chlorinating agent is dissolved may be mixed with the NH$_4$CL solution 14.

As shown in FIG. 1, the flue gas 12 is fed into the wet desulfurization apparatus 25 through the air heater 22 and the dust collector 23, after NOx is reduced and Hg is oxidized in the flue gas 12, in the reduction denitration apparatus 20. A heat collector may be provided between the air heater 22 and the dust collector 23. HgCl in the flue gas 12 is absorbed by the limestone-gypsum slurry 24 used as an alkali absorbent in the wet desulfurization apparatus 25, and separated and removed from the flue gas 12. Accordingly, the flue gas 12 is purified. The purified flue gas is discharged from a stack 68 as purified gas 67. Here, the limestone-gypsum slurry 24 is used as the alkali absorbent. However, any solution that can absorb HgCl in the flue gas 12 can be used as the alkali absorbent.

A mixer that mixes NH$_3$ gas and HCl gas may be provided downstream of the two-fluid nozzle 55 and upstream of the reduction denitration apparatus 20. The mixer, for example, may be a static mixer and the like. If the NH$_3$ gas and the HCl gas generated by evaporating the NH$_4$Cl solution 14 sprayed from the two-fluid nozzle 55 are not dispersed enough, the mixer provided upstream of the reduction denitration apparatus 20 can uniformly disperse the NH$_3$ gas and the HCl gas in the flue gas 12.

A flowmeter 71 that measures the flow rate of the mixed solution 17 sprayed from the two-fluid nozzle 55 may be provided downstream of the two-fluid nozzle 55. Accordingly, the flow rate of the mixed solution 17 sprayed from the two-fluid nozzle 55 can be measured. The flow velocity of the flue gas 12 in the flue 18 can also be measured.

NOx concentration meters 72-1 and 72-2 are provided at an inlet side and an outlet side of the reduction denitration apparatus 20. The reduction rate of NOx in the reduction denitration apparatus 20 can be identified, from the NOx concentration value in the flue gas 12 measured by the NOx concentration meters 72-1 and 72-2. By controlling the concentration and the supply flow rate of the NH$_4$Cl solution 14, from the value of the NOx concentration in the flue gas 12 measured by the NOx concentration meters 72-1 and 72-2, the concentration and the supply flow rate of the NH$_4$Cl solution 14 sprayed from the two-fluid nozzle 55 can be adjusted, thereby satisfying a predetermined denitration performance.

The concentrations of NH$_3$ and HCl of the flue gas 12 supplied into the flue 18 are set, relative to the NOx concentration of the flue gas 12, so that the ratio between the molar number of NH$_3$ and the molar number of NOx in the flue gas 12 (NH$_3$/NOx molar ratio) is a value equal to or less than one, based on the required denitration performance.

NH$_3$ may be added, by spraying the NH$_3$ gas dissociated from the NH$_4$Cl solution 14 into the flue 18, and injecting NH$_3$ obtained from NH$_3$ gas 81 into the flue 18, so that Nox falls within a range from a few tens to a few hundreds parts per million, or preferably from a few tens to 200 parts per million. This is because NH$_3$ and NOx react at a molar ratio of 1:1, and if NH$_3$ is over-supplied, an excess of NH$_3$ is remained after the reaction. Acid sulfate is produced from NH$_3$ and the components in the flue gas 12, and may corrode and damage the inside of the flue 18, the air heater 22, the dust collector 23, and the like, and may lead to blockage due to ash deposition. Accordingly, it is possible to prevent the flue gas 12 from leaking from the damaged flue 18.

The Hg concentration in the flue gas 12 is preferably set in a range equal to or more than 0.1 μg/m$^3$N and equal to or less than a few ten μg/m$^3$N, and relative to the HCl concentration in the flue gas 12, it is preferable to set in a range equal to or less than 1/1000 in molar ratio.

The mercury reduction system 10A according to the present embodiment also includes a mercury (Hg) concentration meter 73 that measures mercury (Hg) contained in the treatment gas discharged from the reduction denitration apparatus 20, and a hydrogen chloride (HCl) concentration meter 74 that measures HCl contained in the flue gas 12 supplied to the wet desulfurization apparatus 25. The Hg concentration meter 73 may be provided downstream of the wet desulfurization apparatus 25, and may measure mercury (Hg) contained in the treatment gas discharged from the wet desulfurization apparatus 25.

The oxidation rate of Hg in the reduction denitration apparatus 20 can be identified from the values of the HCl concentration and the Hg concentration in the flue gas 12 measured by an Hg concentration meter 73 and an HCl concentration meter 74. The supply flow rate of the NH$_4$Cl solution 14 sprayed from the two-fluid nozzle 55 is adjusted, from the value of the Hg concentration in the flue gas 12 measured by the Hg concentration meter 73 and the HCl concentration meter 74. Accordingly, a predetermined denitration performance can be satisfied and the oxidation performance of Hg can be maintained.

The additional amount of the NH$_4$Cl solution 14 and the supply flow rate of the HCl solution 16 are controlled, so that the combination of the HCl gas dissociated from the NH$_4$Cl solution 14 and the HCl gas generated by evaporating the HCl solution 16 has the mercury oxidation rate (Hg$^{2+}$/Hg$^T$) of equal to or more than 95%, or the metallic mercury concentration (Hg$^0$) of equal to or less than 1 μg/Nm$^3$, at the outlet of the reduction denitration apparatus 20. Hg$^T$ is the total mercury concentration, and expressed by a sum of the metallic mercury concentration (Hg$^0$) and the oxidized mercury concentration (Hg$^{2+}$), as the following formula (4).

$$Hg^T = Hg^0 + Hg^{2+} \qquad (4)$$

The supplies of the NH$_4$Cl solution 14, the NH$_3$ solution 15, and the HCl solution 16 may be determined by calculating the contents of NOx, Hg, and HCl in the flue gas 12, from the nature of coal used in the boiler 11. In other words, the contents of NOx, Hg, and HCl in the flue gas 12 can be obtained by burning the nature of coal in the boiler 11. When the maximum amount of the coal is burned in the boiler 11, the maximum amounts of NOx, Hg, HCl in the flue gas 12 can be obtained from the combustion amount of the boiler 11. Consequently, the supplies of the NH$_4$Cl solution 14, the NH$_3$ solution 15, and the HCl solution 16 can be determined by obtaining the contents of NOx, Hg, and HCl in the flue gas 12 from the nature of the coal used in the boiler 11.

Accordingly, the mercury reduction system 10A according to the present embodiment can supply the NH$_4$Cl solution 14, the NH$_3$ solution 15, and the HCl solution 16 into the flue 18, based on the balance of the concentrations of NOx and Hg in the flue gas 12 discharged from combustion equipment such as the boiler 11. Accordingly, HCl or NH$_3$ can be supplied by adjusting the required amount.

<Method of Controlling Supply>

An arithmetic apparatus 42 calculates the required amounts of NH$_3$ and HCl, based on the analyzed results of the NOx concentration and the Hg concentration in the flue gas 12, measured by the NOx concentration meters 72-1 and 72-2, and the Hg concentration meter 73. The arithmetic apparatus 42 determines the supplies of the NH$_4$Cl solution 14, the NH$_3$ solution 15, and the HCl solution 16, from the obtained concentrations of NH$_3$ and HCl. The arithmetic apparatus 42 adjusts the supplies of the NH$_4$Cl solution 14, the NH$_3$ solution 15, and the HCl solution 16, by controlling the opening and closing of the adjusting valves V2 to V4. The arithmetic apparatus 42 calculates the flow rate and the flow velocity of the mixed solution 17, based on the flow rate of the mixed solution 17 measured by the flowmeter 71, and the supply of the mixed solution 17 is adjusted by controlling the opening and closing of the adjusting valve V5.

If the mercury oxidation rate (Hg$^{2+}$/Hg$^T$) obtained by the Hg concentration meter 73 is smaller than 0.95, or if the metallic mercury concentration (Hg$^0$) is larger than 1 μg/Nm$^3$, the amount of HCl to be added is increased. HCl may be added, for example, by increasing the supply of the HCl solution 16.

The NOx concentration meter 72-2 measures the NOx concentration and the NH$_3$ concentration in the flue gas 12 at the outlet side of the reduction denitration apparatus 20. If the measured NH$_3$ concentration in the flue gas 12 is larger than 1 part per million, the amount of NH$_3$ to be added is reduced. If the NOx concentration in the flue gas 12 measured by the NOx concentration meter 72-2 is smaller than 1 part per million, the amount of NH$_3$, to be added is increased. However, the NH$_3$ concentration is set, so that the ratio of the molar number of NH$_3$ to the molar number of NOx of the flue gas 12 (NH$_3$/NOx molar ratio), is a value equal to or less than one based on the required denitration performance, relative to the NOx molar flow velocity (mol/H) at the inlet side of the flue gas 12. NH$_3$ can be added, for example, by increasing and decreasing the supply of the NH$_3$ solution 15.

In this manner, in the mercury reduction system 10A according to the present embodiment, the mixed solution 17 obtained by mixing the NH$_4$Cl solution 14, the NH$_3$ solution 15, and the HCl solution 16 is sprayed into the flue 18 of the boiler 11, from the mixed solution dissolving tank 47 by the two-fluid nozzle 55. Accordingly, the NH$_4$Cl solution 14, the NH$_3$ solution 15, and the HCl solution 16 are evaporated into HCl gas and NH$_3$ gas, thereby oxidizing and reducing Hg and NOx in the flue gas 12 on the denitration catalyst. Because the supplies of the NH$_4$Cl solution 14, the NH$_3$ solution 15, and the HCl solution 16 in the mixed solution 17 are adjusted, appropriate amounts of the reducing agent and the mercury chlorinating agent can be arbitrarily supplied, based on the gaseous nature of the flue gas 12.

Second Embodiment

A mercury reduction system according to a second embodiment of the present invention will now be described with reference to the accompanying drawings.

The mercury reduction system according to the second embodiment of the present invention has the same configuration as the mercury reduction system according to the first embodiment. Accordingly, in the present embodiment, only a part of the configuration of the mercury reduction system will be described with accompanying drawings.

Figure 8:
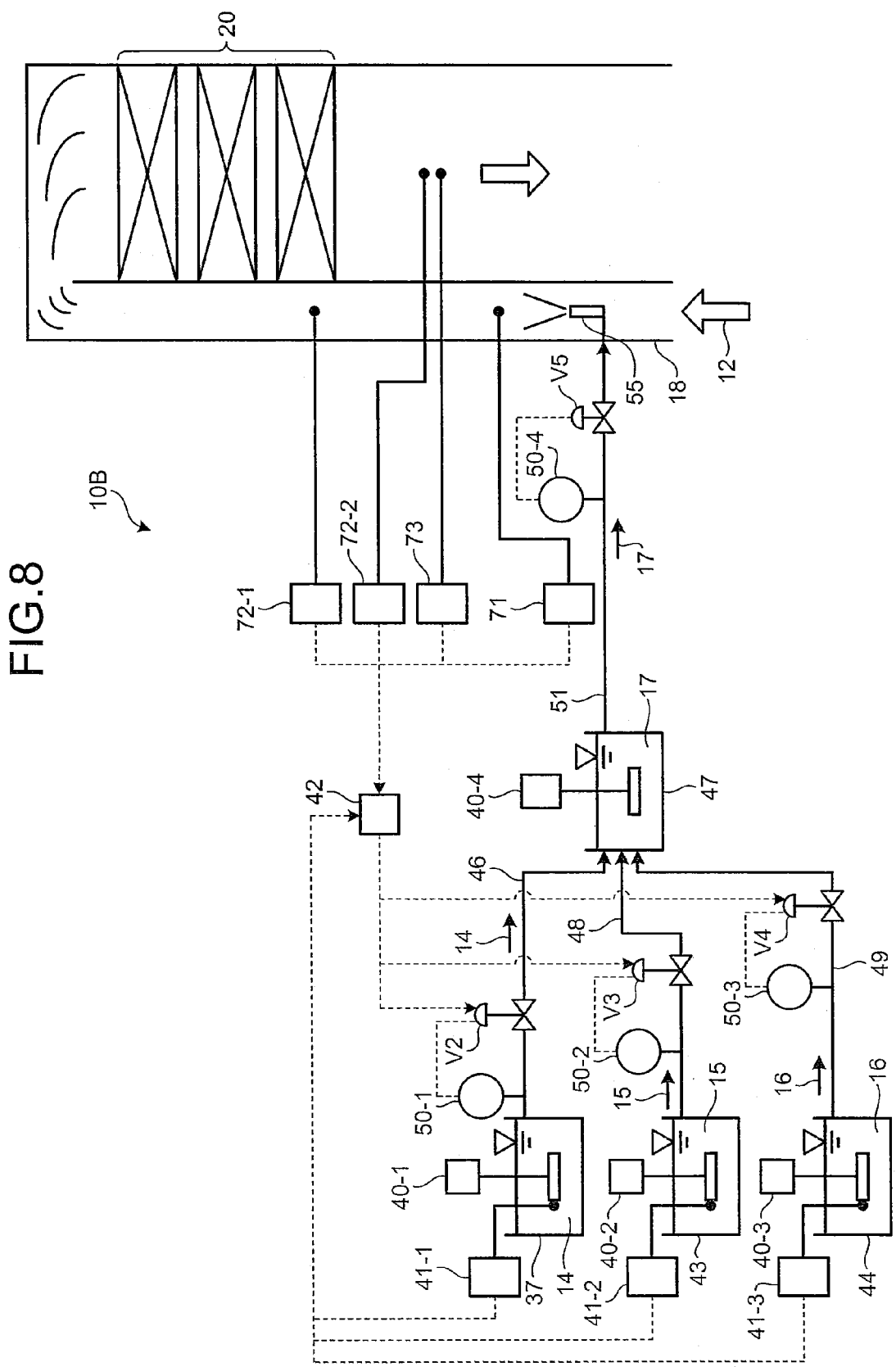
FIG. 8 is a schematic of a part of a mercury reduction system according to a second embodiment of the present invention.

FIG. 8 is a schematic of a part of the mercury reduction system according to the second embodiment of the present invention. The same members as those of the mercury reduction system according to the first embodiment are denoted by the same reference numerals, and the detailed descriptions thereof will be omitted.

As shown in FIG. 8, a mercury reduction system 10B according to the present embodiment includes concentration meters 41-1 to 41-3 that measure the concentrations of NH$_4$Cl, NH$_3$, and HCl in the solutions, in the NH$_4$Cl dissolving tank 37, the NH$_3$ dissolving tank 43, and the HCl dissolving tank 44, respectively.

The concentration meter 41-1 measures the concentration of NH$_4$Cl in the NH$_4$Cl solution 14, the concentration meter 41-2 measures the concentration of NH$_3$ in the NH$_3$ solution 15, and the concentration meter 41-3 measures the concentration of HCl in the HCl solution 16. The results of the measured concentrations of the NH$_4$Cl solution 14, the NH$_3$ solution 15, and the HCl solution 16 are sent to the arithmetic apparatus 42. The arithmetic apparatus 42 obtains the feed rates of the NH$_4$Cl solution 14, the NH$_3$ solution 15, and the HCl solution 16 fed into the mixed solution dissolving tank 47, based on the concentration values of NH$_4$Cl, NH$_3$, and HCl in the NH$_4$Cl solution 14, the NH$_3$ solution 15, and the HCl solution 16, measured by the concentration meters 41-1 to 41-3, respectively.

The arithmetic apparatus 42 transmits the feed rates of the NH$_4$Cl solution 14, the NH$_3$ solution 15, and the HCl solution 16 calculated by the arithmetic apparatus 42 to the adjusting valves V2 to V5, respectively. By adjusting the opening and closing of the adjusting valves V2 to V5, the flow rate of the NH$_4$Cl solution 14 that flows through the NH$_4$Cl solution feed pipe 46, the flow rate of the NH$_3$ solution 15 that flows through the NH$_3$ solution feed pipe 48, and the flow rate of the HCl solution 16 that flows through the HCl solution feed pipe 49 can be adjusted.

In this manner, the supplies of the NH$_4$Cl solution 14, the NH$_3$ solution 15, and the HCl solution 16 are adjusted, based on the concentrations of NH$_4$Cl, NH$_3$, and HCl in the NH$_4$Cl solution 14, the NH$_3$ solution 15, and the HCl solution 16. Accordingly, the mixed solution 17 with appropriate concentrations of NH$_4$Cl, NH$_3$, and HCl can be generated, thereby supplying into the flue 18.

Third Embodiment

A mercury reduction system according to a third embodiment of the present invention will now be described with reference to the accompanying drawings.

Figure 9:
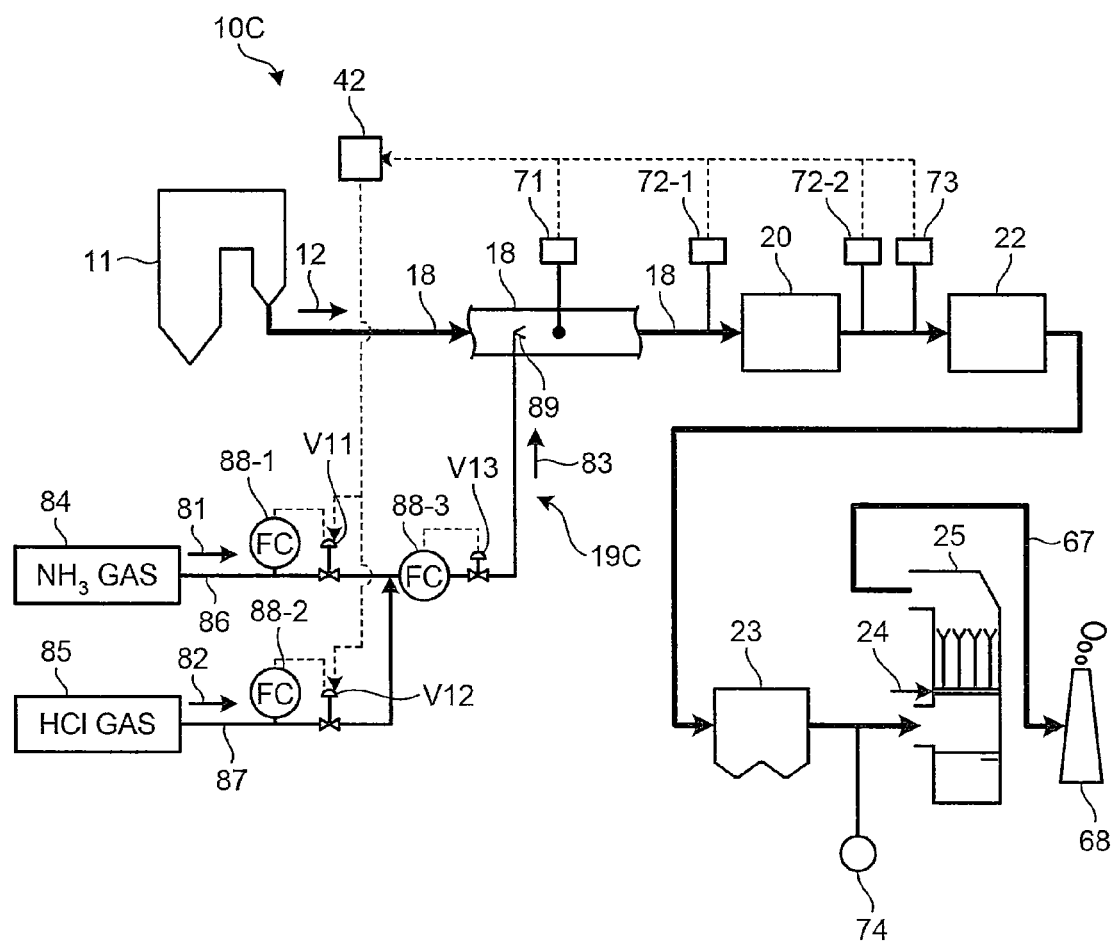
FIG. 9 is a schematic of a mercury reduction system according to a third embodiment of the present invention.
Figure 10:
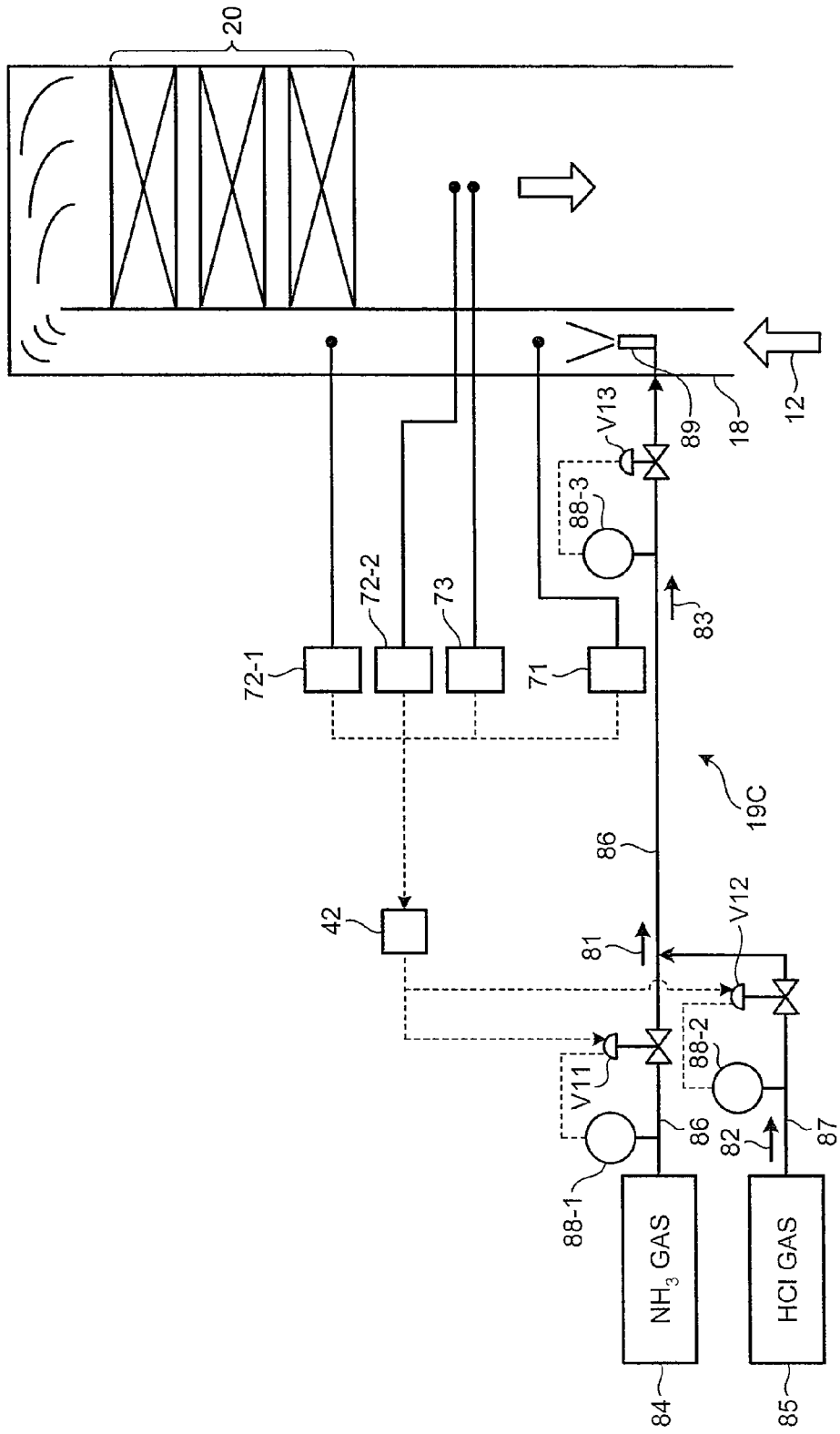
FIG. 10 is a schematic of a part of the mercury reduction system.
Figure 11:
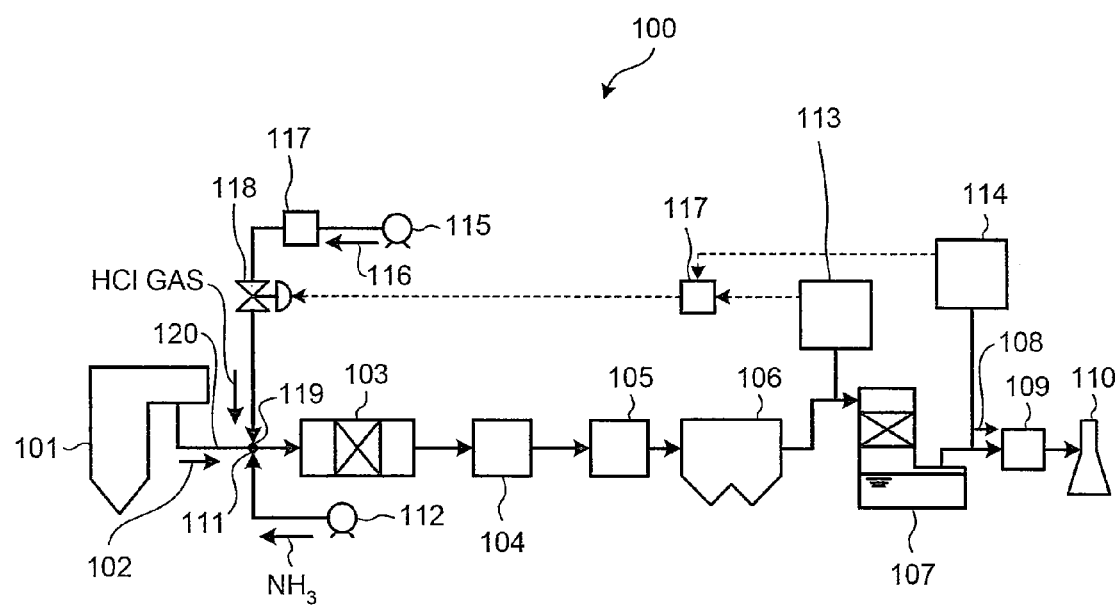
FIG. 11 is a schematic of a conventional flue gas control system including a mercury reduction system.

FIG. 9 is a schematic of the mercury reduction system according to the third embodiment of the present invention. FIG. 10 is a schematic of a part of the mercury reduction system. The same members as those of the mercury reduction system according to the first and the second embodiments are denoted by the same reference numerals, and the detailed descriptions thereof will be omitted.

As shown in FIGS. 9 and 10, a mercury reduction system 10C according to the present embodiment supplies NH$_4$Cl, NH$_3$, and HCl in gaseous states, that are supplied by the mercury reduction system 10A according to the first embodiment of the present invention shown in FIGS. 1 and 2, in liquid states.

In other words, as shown in FIGS. 9 and 10, the mercury reduction system 10C according to the present embodiment is a mercury reduction system that reduces NOx and Hg in the flue gas 12 discharged from the boiler 11. The mercury reduction system 10C includes a chemical supplying unit 19C that mixes the NH$_3$ gas 81 used as a reducing agent and HCl gas 82 used as a mercury chlorinating agent in gaseous states, and supplies mixed gas 83 into the flue 18 of the boiler 11. The mercury reduction system 10C also includes the reduction denitration apparatus 20 including a denitration catalyst that reduces NOx in the flue gas 12 with NH$_3$ and oxidizes Hg in the presence of HCl, the air heater (APH) 22 that heat-exchanges the denitrated flue gas 12, the dust collector 23 that reduces dust in the denitrated flue gas 12, and the wet desulfurization apparatus 25 that reduces Hg oxidized in the reduction denitration apparatus 20 with the limestone-gypsum slurry 24 as an alkali absorbent.

The chemical supplying unit 19C also includes an NH$_3$ gas supplying unit 84 that supplies the NH$_3$ gas 81 used as a reducing agent as a gaseous material, an HCl gas supplying unit 85 that supplies the HCl gas 82 used as a mercury chlorinating agent as a gaseous material, an NH$_3$ gas feed pipe 86 that supplies the NH$_3$ gas 81 from the NH$_3$ gas supplying unit 84 into the flue 18, and an HCl gas feed pipe 87 that connects between the HCl gas supplying unit 85 and the NH$_3$ gas feed pipe 86.

The NH$_3$ gas feed pipe 86 includes a flowmeter 88-1 that measures the flow rate of the NH$_3$ gas 81, and the HCl gas feed pipe 87 includes a flowmeter 88-2 that measures the flow rate of the HCl gas 82. The flowmeters 88-1 and 88-2 measure the NH$_3$ gas 81 and the HCl gas 82, respectively, and adjusting valves V11 and V12 adjust the flow rates of the NH$_3$ gas 81 and the HCl gas 82, respectively. A flowmeter 88-3 that measures the flow rate of the mixed gas 83 is provided downstream of the NH$_3$ gas feed pipe 86, where the NH$_3$ gas 81 and the HCl gas 82 are mixed. The flowmeter 88-3 measures the mixed gas 83, and an adjusting valve V13 adjusts the flow rate of the mixed gas 83 supplied into the flue 18.

In the chemical supplying unit 19C, the NH$_3$ gas 81 and the HCl gas 82 are mixed before being fed into the flue 18, and injected into the flue 18 from an injection nozzle 89 as the mixed gas 83. The NH$_3$ gas 81 and the HCl gas 82 in the mixed gas 83 are fed to the reduction denitration apparatus 20 accompanied with the flue gas 12. As described above, on the denitration catalyst of the reduction denitration apparatus 20, the NH$_3$ gas is used to carry out reduction denitration of NOx, as the following formula (5), and the HCl gas is used to carry out oxidation of Hg as the following formula (6).

$$4NO + 4NH_3 + O_2 \rightarrow 4N_2 + 6H_2O \quad (5)$$

$$Hg + 1/2O_2 + 2HCl \rightarrow HgCl_2 + H_2O \quad (6)$$

Accordingly, in the mercury reduction system 10C according to the present embodiment, the mixed gas 83 containing the NH$_3$ gas 81 and the HCl gas 82 are injected into the flue 18 of the boiler 11 from the injection nozzle 89. Consequently, appropriate amounts of the NH$_3$ gas 81 and the HCl gas 82 can be supplied into the flue 18 from the injection nozzle 89, based on the gaseous nature of the flue gas 12.

The NH$_3$ gas 81 and the HCl gas 82 are separately supplied from the NH$_3$ gas supplying unit 84 and the HCl gas supplying unit 85, and mixed. Accordingly, based on the balance of the concentrations of NOx and Hg in the flue gas 12 discharged from combustion equipment such as the boiler 11, the feed rates of the NH$_3$ gas 81 and the HCl gas 82 forming the mixed gas 83 can be adjusted'. Consequently, it is possible to arbitrarily adjust the supplies of the NH$_3$ gas 81 and the HCl gas 82 in advance, thereby adjusting the required amount of HCl or NH$_3$, and feeding into the flue 18.

Because the mixed gas 83 is a gaseous material, the mixed gas 83 can be sprayed into the flue 18 relatively uniformly. Accordingly, it is possible to reduce the fluctuation of concentration distribution of NH$_3$ gas and HCl gas in the flue 18. This is because, as the mercury reduction systems 10A and 10B according to the first and the second embodiments of the present invention, as shown in FIGS. 1, 2, and 8, if the liquid materials such as the NH$_4$Cl solution 14, the NH$_3$ solution 15, and the HCl solution 16 are sprayed into the flue 18 and collide with the structures in the flue 18, the thermal strain is caused by thermal shock, and may damage the structures. A spraying nozzle such as the two-fluid nozzle 55 is installed, so as to avoid the liquid droplets of the NH$_4$Cl solution 14, the NH$_3$ solution 15, and the HCl solution 16 from colliding with the structures before evaporating. By doing so, a region where the concentrations of NH$_3$ gas and HCl gas generated from the NH$_4$Cl solution 14, the NH$_3$ solution 15, and the HCl solution 16 become low is produced near the inner wall of the flue 18.

Alternatively, in the mercury reduction system 10C according to the present embodiment, the mixed gas 83 is sprayed into the flue 18 of the boiler 11 as a gaseous material. Accordingly, NH$_3$ gas and HCl gas can be injected into the flue 18 relatively uniformly, thereby eliminating the region where the concentrations of the NH$_3$ gas 81 and the HCl gas 82 become low in the flue 18. Consequently, it is possible to reduce the fluctuation of concentration distribution of the NH$_3$ gas 81 that is a reducing agent, and the HCl gas 82 that is a mercury chlorinating agent.

The injection nozzle 89 is installed inside the flue 18, and a part of the NH$_3$ gas feed pipe 86 is inserted into the flue 18. Accordingly, the mixed gas 83 can be heated, and the gaseous states of the NH$_3$ gas 81 and the HCl gas 82 in the mixed gas 83 can be maintained.

The temperature of the injection nozzle 89 and the temperature of the NH$_3$ gas feed pipe 86 inserted into the flue 18 are preferably, for example, equal to or more than 270° C., and more preferably equal to or more than 350° C. This is to prevent NH$_4$Cl from depositing on the end of the injection nozzle 89 and in the NH$_3$ gas feed pipe 86. If the temperature of the injection nozzle 89 and the temperature of the NH$_3$ gas feed pipe 86 are equal to or more than 350° C., the NH$_3$ gas 81 and the HCl gas 82 can be gasified without fail.

To maintain the gaseous states of the NH$_3$ gas 81 and the HCl gas 82 in the mixed gas 83 without fail, a heater to heat the mixed gas 83 may be included in the NH$_3$ gas feed pipe 86.

In the mercury reduction system 10C according to the present embodiment, the NH$_3$ gas 81 and the HCl gas 82 are used as the gaseous materials. However, the present invention is not limited thereto. For example, gas formed of other hydrogen halide such as hydrogen bromide (HBr) and hydrogen iodide (HI) may be used as a mercury chlorinating agent, instead of the HCl gas 82.

The NH$_3$ gas 81 is used as a reducing agent. However, the present invention is not limited thereto, and any gaseous material that can reduce NOx may be used.

As shown in FIG. 9, the flue gas 12 is fed into the wet desulfurization apparatus 25 through the air heater 22 and the dust collector 23, after NOx is reduced and Hg is oxidized in the flue gas 12, in the reduction denitration apparatus 20. A heat collector may be provided between the air heater 22 and the dust collector 23. HgCl in the flue gas 12 is absorbed by the limestone-gypsum slurry 24 used as an alkali absorbent in the wet desulfurization apparatus 25, and separated and reduced from the flue gas 12. Accordingly, the flue gas 12 is purified. The purified flue gas is discharged from a stack 68 as purified gas 67.

In this manner, in the mercury reduction system 10C according to the present embodiment, the mixed gas 83 containing the $NH_3$ gas 81 and the HCl gas 82 is supplied into the flue 18 of the boiler 11. Accordingly, on the denitration catalyst, Hg in the flue gas 12 is oxidized with the HCl gas 82 on the denitration catalyst, and NOx therein is reduced with the $NH_3$ gas 81. By adjusting the proportion of the $NH_3$ gas 81 and the HCl gas 82 in the mixed gas 83, appropriate amounts of the $NH_3$ gas 81 and the HCl gas 82 can be arbitrarily supplied, based on the gaseous nature of the flue gas 12. Because the mixed gas 83 can be supplied into the flue 18 relatively uniformly, it is possible to reduce the fluctuation of concentration distribution of the reducing agent and the mercury chlorinating agent.

In this manner, the mercury reduction system and the mercury reduction method of flue gas containing mercury according to the present invention can simultaneously supply a reducing agent and a mercury chlorinating agent in any proportion to the flue gas, based on the gaseous nature of the flue gas. Accordingly, the mercury reduction system and the mercury reduction method of flue gas containing mercury according to the present invention can be suitably used for the mercury reduction system for treating exhaust gas discharged from a boiler.

With the present invention, at least two or more of a reducing agent, a mercury chlorinating agent, and an oxidation-reduction agent can be mixed in liquid states or gaseous states, and supplied into a flue. Accordingly, the reducing agent and the mercury chlorinating agent can be simultaneously supplied to flue gas in any proportion with a simple device, based on the gaseous nature of the flue gas. Consequently, it is possible to enhance oxidation and reduction performances of mercury and nitrogen oxide in the flue gas.

What is claimed is:

1. A mercury reduction system that reduces nitrogen oxide and mercury in flue gas discharged from a boiler, the mercury reduction system comprising:
   a chemical supplying unit that mixes at least two or more of a reducing agent for reducing nitrogen oxide in the flue gas on a denitration catalyst, a mercury chlorinating agent for oxidizing mercury in a presence of hydrogen chloride, and an oxidation-reduction agent for reducing nitrogen oxide in the flue gas on a denitration catalyst and for oxidizing mercury in the presence of hydrogen chloride, all in liquid states or all in gaseous states, and supplies a resultant mix into a flue of the boiler;
   a reduction denitration apparatus that includes a denitration catalyst for reducing nitrogen oxide in the flue gas with ammonia and for oxidizing mercury in the presence of hydrogen chloride; and
   a wet desulfurization apparatus that reduces mercury oxidized in the reduction denitration apparatus with an alkali absorbent.

2. The mercury reduction system according to claim 1, wherein
   the reducing agent, the mercury chlorinating agent, and the oxidation-reduction agent are liquid materials, and
   the chemical supplying unit sprays a mixed solution obtained by mixing at least two or more of the liquid materials in a liquid state.

3. The mercury reduction system according to claim 2, wherein the oxidation-reduction agent is an ammonium halide.

4. The mercury reduction system according to claim 2, wherein the reducing agent is ammonia or urea.

5. The mercury reduction system according to claim 2, wherein the mercury chlorinating agent is a hydrogen halide.

6. The mercury reduction system according to claim 2, wherein
   the chemical supplying unit includes
      a chemical feed pipe that feeds the liquid materials into a flue in a liquid state,
      a blow pipe that is inserted into the flue so as to surround the chemical feed pipe, and has an injection hole used to inject air supplied therein into the flue, and
      an injection nozzle that is fitted to an end of the chemical feed pipe and through which the liquid materials are injected, and
   the liquid materials are sprayed into the flue accompanied with the air.

7. The mercury reduction system according to claim 6, wherein the injection nozzle is a two-fluid nozzle through which the liquid materials and the air for spraying the liquid materials are injected.

8. The mercury reduction system according to claim 2, wherein
   the chemical supplying unit includes
      an oxidation-reduction agent feed pipe through which the oxidation-reduction agent is supplied into the flue in a liquid state,
      an air feed pipe that is inserted into the flue so as to surround the oxidation-reduction agent feed pipe and through which air for spraying the oxidation-reduction agent is supplied into the flue, and
      a two-fluid nozzle that is fixed to an end of the oxidation-reduction agent feed pipe and the air feed pipe, and through which the oxidation-reduction agent and the air are injected, wherein
   the oxidation-reduction agent is sprayed into the flue accompanied with the air.

9. The mercury reduction system according to claim 1, wherein
   the reducing agent and the mercury chlorinating agent are gaseous materials, and
   the chemical supplying unit injects mixed gas obtained by mixing at least two or more of the gaseous materials.

10. The mercury reduction system according to claim 9, wherein the reducing agent is ammonia.

11. The mercury reduction system according to claim 9, wherein the mercury chlorinating agent is a hydrogen halide.

12. The mercury reduction system according to claim 1, wherein temperature of the flue gas is equal to or more than 320° C. and equal to or less than 420° C.

13. The mercury reduction system according to claim 1, further comprising a nitrogen oxide concentration meter that is provided upstream and downstream of the reduction denitration apparatus, and measures concentration of nitrogen oxide in the flue gas.

14. The mercury reduction system according to claim 1, further comprising an ammonia supplying unit that is provided between the chemical supplying unit and the reduction denitration apparatus, and supplies ammonia into the flue.

15. The mercury reduction system according to claim 1, further comprising a hydrogen chloride supplying unit that is provided between the chemical supplying unit and the reduction denitration apparatus, and supplies hydrogen chloride into the flue.

16. A mercury reduction method of flue gas containing mercury for reducing nitrogen oxide and mercury in flue gas discharged from a boiler, the mercury reduction method of flue gas containing mercury comprising:

a step of chemical supplying for mixing at least two or more of a reducing agent that reduces nitrogen oxide in the flue gas on a denitration catalyst, a mercury chlorinating agent that oxidizes mercury in a presence of hydrogen chloride, and an oxidation-reduction agent that reduces nitrogen oxide in the flue gas on a denitration catalyst and oxidizes mercury in the presence of hydrogen chloride, as in liquid states or all in gaseous states, and for supplying a resultant mix into a flue of the boiler;

a step of reduction denitration treating for reducing nitrogen oxide in the flue gas on the denitration catalyst with ammonia and oxidizing mercury in the presence of hydrogen chloride; and a step of wet desulfurizing for reducing mercury oxidized at the step of reduction denitration treating with an alkali absorbent.

17. The mercury reduction method of flue gas containing mercury according to claim 16, wherein the reducing agent, the mercury chlorinating agent, and the oxidation-reduction agent are liquid materials, and a mixed solution obtained at the step of chemical supplying by mixing at least two or more of the liquid materials is sprayed in liquid states.

18. The mercury reduction method of flue gas containing mercury according to claim 17, wherein the oxidation-reduction agent is an ammonium halide.

19. The mercury reduction method of flue gas containing mercury according to claim 17, wherein the reducing agent is ammonia or urea.

20. The mercury reduction method of flue gas containing mercury according to claim 17, wherein the mercury chlorinating agent is a hydrogen halide.

21. The mercury reduction method of flue gas containing mercury according to claim 17, wherein the liquid materials are sprayed with a two-fluid nozzle at the step of chemical supplying.

22. The mercury reduction method of flue gas containing mercury according to claim 17, further comprising:

a step of nitrogen oxide concentration measuring that is provided prior to and subsequent to the step of reduction denitration treating, and measures concentration of nitrogen oxide in the flue gas; and a step of mercury concentration measuring that is provided subsequent to the step of reduction denitration treating, and measures concentration of mercury in the flue gas, wherein concentrations of the liquid materials in the mixed solution are adjusted based on at least one of the concentration of nitrogen oxide in the flue gas obtained at the step of nitrogen oxide concentration measuring and the concentration of mercury in the flue gas obtained at the step of mercury concentration measuring, or both of them.

23. The mercury reduction method of flue gas containing mercury according to claim 17, wherein concentrations of the liquid materials in the mixed solution are measured, and supplies of the liquid materials are adjusted based on the concentrations of the liquid materials.

24. The mercury reduction method of flue gas containing mercury according to claim 17, wherein the reducing agent and the mercury chlorinating agent are gaseous materials, and mixed gas obtained by mixing at least two or more of the gaseous materials is sprayed at the step of chemical supplying.

25. The mercury reduction method of flue gas containing mercury according to claim 24, wherein the gaseous material used as the reducing agent is ammonia.

26. The mercury reduction method of flue gas containing mercury according to claim 24, wherein the mercury chlorinating agent is a hydrogen halide.

* * * * *